US012749072B2

(12) United States Patent
Parker et al.

(10) Patent No.: US 12,749,072 B2
(45) **Date of Patent: *Sep. 29, 2026**

(54) COIN OPERATED DIGITAL PAYMENTS HUB

(71) Applicant: ModoPayments, LLC, Plano, TX (US)

(72) Inventors: Bruce Parker, Richardson, TX (US); Aaron Wilkinson, Albany, OR (US); Bion J. Oren, Richardson, TX (US); Gregory W. Harvey, McKinney, TX (US); Matthew R. Leavenworth, Mountain View, CA (US)

(73) Assignee: ModoPayments, LLC, Plano, TX (US)

( * ) Notice: Subject to any disclaimer, the term of this patent is extended or adjusted under 35 U.S.C. 154(b) by 126 days.

This patent is subject to a terminal disclaimer.

(21) Appl. No.: 18/915,135

(22) Filed: Oct. 14, 2024

(65) Prior Publication Data

US 2025/0037118 A1 Jan. 30, 2025

Related U.S. Application Data

(63) Continuation of application No. 17/567,660, filed on Jan. 3, 2022, now Pat. No. 12,118,542, which is a (Continued)

(51) Int. Cl.
*G06Q 20/38* (2012.01)
*G06Q 20/02* (2012.01)
*G06Q 20/40* (2012.01)

(52) U.S. Cl.
CPC ......... *G06Q 20/382* (2013.01); *G06Q 20/027* (2013.01); *G06Q 20/401* (2013.01)

(58) Field of Classification Search
CPC ... G06Q 20/382; G06Q 20/027; G06Q 20/401
See application file for complete search history.

(56) References Cited

U.S. PATENT DOCUMENTS 7,428,988 B1 9/2008 Starr
7,496,536 B2 2/2009 Lasater et al.

(Continued)

FOREIGN PATENT DOCUMENTS

WO 2015051361 A1 4/2015

OTHER PUBLICATIONS

"Accounting transactions created when processing refunds", May 2016.

(Continued)

*Primary Examiner* — Allen C Chein
(74) *Attorney, Agent, or Firm* — Volpe Koenig

(57) ABSTRACT

A system and method are described for a COIN-based payment event data management system. The COIN can provide a consolidated source of accounting for all parties to a transaction by providing for multi-directional translation, resolution, accounting and other functions. A COIN-based hub system can interface with buyers and sellers, requestors and debtors, and other parties. The hub system can communicate with different API's of various parties. Functionality can include means of analyzing payment and transaction behavior. Connectors of the hub system may translate data about a payment event to formatting and native semantics of external systems of record from common transaction semantics and formatting of the hub system, and translate at least of portion of responses from the external systems of record. Further, the connectors may securely communicate the event data to the external systems of record using the formatting and native semantics of the external systems of record.

18 Claims, 27 Drawing Sheets

| | REQUESTED | | | ACTUAL | | | |
|---|---|---|---|---|---|---|---|
| ACCOUNT | STATE | BALANCE | EVENT AMOUNT | STATE | BALANCE | EVENT AMOUNT | COMMENT |
| COIN | ISSUED | | | | | | |
| A | PRESSED | $25 | $25 | PRESSED | $25 | $25 | |
| A | | | | PRESSED | | | |
| B | PRESSED | $25 | $25 | PRESSED | $25 | $25 | |
| B | | | | PRESSED | | | |
| C | PRESSED | $25 | $25 | PRESSED | $25 | $25 | |
| C | | | | PRESSED | | | |
| D | PRESSED | $25 | $25 | PRESSED | $25 | $25 | |
| D | | | | PRESSED | | | |
| E | PRESSED | $25 | $25 | PRESSED | $25 | $25 | |
| E | | | | PRESSED | | | |
| F | PRESSED | $25 | $25 | PRESSED | $25 | $25 | |
| F | | | | PRESSED | | | |
| G | PRESSED | $0 | $0 | PRESSED | $0 | $0 | |
| G | | | | PRESSED | | | |
| COIN | PRESSED | | | | | | |

Related U.S. Application Data continuation of application No. 15/697,145, filed on Sep. 6, 2017, now Pat. No. 11,216,805.

(60) Provisional application No. 62/384,838, filed on Sep. 8, 2016.

(56) References Cited

U.S. PATENT DOCUMENTS

| | | | |
|---|---|---|---|
| 11,216,805 B2 | 1/2022 | Parker et al. |
| 2004/0039692 A1 | 2/2004 | Shields et al. |
| 2004/0148252 A1 | 7/2004 | Fleishman |
| 2007/0011014 A1 | 1/2007 | Umapathy |
| 2007/0038560 A1 | 2/2007 | Ansley |
| 2008/0103923 A1 | 5/2008 | Rjeck et al. |
| 2012/0209762 A1 | 8/2012 | Metaireau et al. |
| 2012/0253997 A1 | 10/2012 | Kovalev |
| 2013/0238455 A1 | 9/2013 | Laracey |
| 2014/0188702 A1 | 7/2014 | Green et al. |
| 2014/0358745 A1 | 12/2014 | Lunan |
| 2015/0242834 A1 | 8/2015 | Goldsmith et al. |
| 2015/0302412 A1 | 10/2015 | Bhanoo |

OTHER PUBLICATIONS

Gamestop receipt. Apr. 2015, available at https://www.orensmonkeysaver.com/2015/04/upgrade-gamestop-gif-card-to-amazon.html.

"Returns Payment Processing and Refund Fulfillment", 2013, https://www.ibm.com/support/knowledgecenter/en/SS6QYM 9.1.0/com.ibm.help.prod.concepts.doc/ReturnsPaymentProcessingAndRefundFulfillment.html (Year: 2013).

"Sterling Selling and Fulfillment Foundation Product Concepts Guide" 2011, ftp://ftp.www.ibm.com/software/commerce/doc/ssfs/91/ProductConcentsGuide.pdf.

International Search Report and Written Opinion dated Jan. 5, 2018 for International Application No. PCT/US2017/050396. 17 pgs.

IBM. "Sterling Selling and Fulfillment Foundation Products Concept Guide Release 9.1", 2011 (Year: 2011).

"What is EDI", snapshot taken 2013. Https://web.archive.org/web/20131207214434/https://www.edibasics.com/what-is-edi/ (Year: 2013).

Saltzman, "Payment Data Structures", Jun. 2015. https://prezi.com/8vatbh5ebogb/payment-data-structures/ (Year: 2015).

*Modopayments, LLC* v. *Volvo Financial Services*, Complaint (Jul. 12, 2024).

*Modopayments, LLC* v. *Volvo Financial Services*, First Amended Complaint, C.A. No. 1:24-cv-00810-GBW (Aug. 22, 2024).

*Modopayments, LLC* v. *Volvo Financial Services*, Defendant's Motion to Partially Dismiss Plaintiff's Amended Complaint Pursuant to Fed. R. Civ. P. 12(b)(6), 35 U.S.C. § 101 and 17 U.S.C. §§ 101 et seq., C.A. No. 1:24-cv-00810-GBW (Sep. 19, 2024).

*Modopayments, LLC* v. *Volvo Financial Services*, Defendant's Opening Brief in Support of their Motion to Partially Dismiss Plaintiff's Amended Complaint Pursuant to Fed. R. Civ. P. 12(b)(6), 35 U.S.C. § 101 and 17 U.S.C. §§ 101 et seq., C.A. No. 1:24-cv-00810-GBW (Sep. 19, 2024).

*Modopayments, LLC* v. *Volvo Financial Services*, Plaintiff's Opposition to Defendant's Motion to Partially Dismiss Plaintiff's Amended Complaint Pursuant to Fed. R. Civ. P. 12(b)(6), 35 U.S.C. § 101 and 17 U.S.C. §§ 101 et seq., C.A. No. 1:24-cv-00810-GBW (Oct. 17, 2024).

*Modopayments, LLC* v. *Volvo Financial Services*, Defendant's Reply in Support of Motion to Partially Dismiss Plaintiff's Amended Complaint Pursuant to Fed. R. Civ. P. 12(b)(6), 35 U.S.C. § 101 and 17 U.S.C. §§ 101 et seq., C.A. No. 1:24-cv-00810-GBW (Oct. 31, 2024).

*Modopayments, LLC* v. *Volvo Financial Services*, Oral Order, C.A. No. 1:24-cv-00810-GBW (Nov. 4, 2024).

*Modopayments, LLC* v. *Volvo Financial Services*, Plaintiff's Request for Oral Argument, C.A. No. 1:24-cv-00810-GBW (Nov. 7, 2024).

*Modopayments, LLC* v. *Volvo Financial Services*, Plaintiff ModoPayments, LLC's Letter Brief Regarding Nov. 4, 2024 Oral Order (D.I.21), C.A. No. 1:24-cv-00810-GBW (Nov. 18, 2024).

*Modopayments, LLC* v. *Volvo Financial Services*, Letter to the Honorable Gregory B. Williams from Andrew E. Russell, C.A. No. 1:24-cv-00810-GBW (Nov. 18, 2024).

| TYPE | ID | STATE | PENDING | API | EVENT | BALANCE | ORIGINAL | BEST BY |
|---|---|---|---|---|---|---|---|---|
| TRANSACTION | 1 | PRESSED | | | 100 | 100 | 100 | NOW |
| EVENT | 1 | PRESSED | | | | | | |
| TRANSACTION | 2 | STAMPED | YES | | 100 | 100 | 100 | NOW+10 DAYS |
| TRANSACTION | 3 | STAMPED | | 100 | 100 | 100 | 100 | NOW+7 DAYS |
| EVENT | 2 | STAMPED | | | | | | |
| TRANSACTION | 4 | CIRCULATED | YES | | 100 | 100 | 100 | NOW+30 DAYS |
| TRANSACTION | 5 | CIRCULATED | | 100 | 100 | 100 | 100 | NOW+30 DAYS |
| EVENT | 3 | CIRCULATED | | | | | | |
| TRANSACTION | 6 | CERTIFIED | | 10000 | 100 | 100 | 100 | NOW+90 DAYS |
| EVENT | 4 | CERTIFIED | | | | | | |
| TRANSACTION | 7 | ENCASED | | | 100 | 100 | 100 | NOW |
| EVENT | 5 | ENCASED | | | | | | |

FIG. 9

| TYPE | ID | STATE | PENDING | API | EVENT | BALANCE | ORIGINAL | BEST BY |
|---|---|---|---|---|---|---|---|---|
| TRANSACTION | 1 | PRESSED | | | 100 | 100 | 100 | NOW |
| EVENT | 1 | PRESSED | | | | | | |
| TRANSACTION | 2 | STAMPED | YES | | 100 | 100 | 100 | NOW+10 DAYS |
| TRANSACTION | 3 | STAMPED | | 100 | 100 | 100 | 100 | NOW+7 DAYS |
| EVENT | 2 | STAMPED | | | | | | |
| TRANSACTION | 4 | CIRCULATED | YES | | 100 | 100 | 100 | NOW+30 DAYS |
| TRANSACTION | 5 | CIRCULATED | | 100 | 100 | 100 | 100 | NOW+30 DAYS |
| EVENT | 3 | CIRCULATED | | | | | | |
| TRANSACTION | 6 | CIRCULATED | YES | | -100 | 0 | 100 | NOW+30 DAYS |
| TRANSACTION | 7 | CIRCULATED | | 95 | -95 | 5 | 100 | NOW+30 DAYS |
| TRANSACTION | 8 | CERTIFIED | | 5 | 5 | 5 | 5 | NOW+90 DAYS |
| EVENT | 4 | CERTIFIED | | | | | | |
| TRANSACTION | 9 | ENCASED | | 5 | 5 | 5 | 5 | NOW |
| EVENT | 5 | ENCASED | | | | | | |

FIG. 10

| TYPE | ID | STATE | PENDING | API | EVENT | BALANCE | ORIGINAL | BEST BY |
|---|---|---|---|---|---|---|---|---|
| TRANSACTION | 1 | PRESSED | | | 100 | 100 | 100 | NOW |
| EVENT | 1 | PRESSED | | | | | | |
| TRANSACTION | 2 | STAMPED | YES | | 100 | 100 | 100 | NOW+10 DAYS |
| TRANSACTION | 3 | STAMPED | | 100 | 100 | 100 | 100 | NOW+7 DAYS |
| EVENT | 2 | STAMPED | | | | | | |
| TRANSACTION | 4 | STAMPED | | | -100 | 0 | 100 | NOW |
| EVENT | 3 | PRESSED | | | | | | |
| TRANSACTION | 5 | STAMPED | YES | | 100 | 100 | 100 | NOW+10 DAYS |
| TRANSACTION | 6 | STAMPED | | 100 | 100 | 100 | 100 | NOW+7 DAYS |
| EVENT | 4 | STAMPED | | | | | | |
| TRANSACTION | 7 | CIRCULATED | YES | | 100 | 100 | 100 | NOW+30 DAYS |
| TRANSACTION | 8 | CIRCULATED | | 100 | 100 | 100 | 100 | NOW+30 DAYS |
| EVENT | 5 | CIRCULATED | | | | | | |
| TRANSACTION | 9 | CERTIFIED | | 10000 | 100 | 100 | 100 | NOW+90 DAYS |
| EVENT | 6 | CERTIFIED | | | | | | |
| TRANSACTION | 10 | ENCASED | | | 100 | 100 | 100 | NOW |
| EVENT | 7 | ENCASED | | | | | | |

FIG. 11

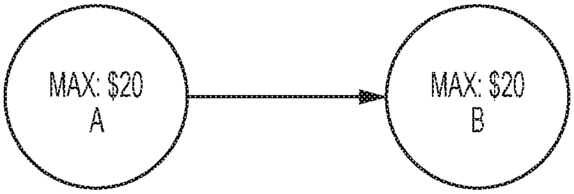

| REQUESTED | | | | ACTUAL | | |
|---|---|---|---|---|---|---|
| ACCOUNT | STATE | BALANCE | EVENT AMOUNT | STATE | BALANCE | EVENT AMOUNT |
| COIN | ISSUED | | | | | |
| A | PRESSED | $20 | $20 | PRESSED | $20 | $20 |
| A | | | | PRESSED | | |
| B | PRESSED | $20 | $20 | PRESSED | $20 | $20 |
| B | | | | PRESSED | | |
| COIN | PRESSED | | | | | |
| A | STAMPED | $20 | $20 | STAMPED | $20 | $20 |
| A | | | | STAMPED | | |
| B | STAMPED | $20 | $20 | STAMPED | $20 | $20 |
| B | | | | STAMPED | | |
| COIN | STAMPED | | | | | |
| A | CIRCULATED | $20 | $20 | CIRCULATED | $20 | $20 |
| A | | | | CIRCULATED | | |
| B | CIRCULATED | $20 | $20 | CIRCULATED | $20 | $20 |
| B | | | | CIRCULATED | | |
| COIN | CIRCULATED | | | | | |
| A | CERTIFIED | $20 | $20 | CERTIFIED | $20 | $20 |
| A | | | | CERTIFIED | | |
| B | CERTIFIED | $20 | $20 | CERTIFIED | $20 | $20 |
| B | | | | CERTIFIED | | |
| COIN | CERTIFIED | | | | | |
| A | ENCASED | $20 | $20 | ENCASED | $20 | $20 |
| A | | | | ENCASED | | |
| B | ENCASED | $20 | $20 | ENCASED | $20 | $20 |
| B | | | | ENCASED | | |
| COIN | ENCASED | | | | | |

FIG. 13

| | REQUESTED | | | ACTUAL | | | |
|---|---|---|---|---|---|---|---|
| ACCOUNT | STATE | BALANCE | EVENT AMOUNT | STATE | BALANCE | EVENT AMOUNT | COMMENT |
| COIN | ISSUED | | | | | | |
| A | PRESSED | $25 | $25 | PRESSED | $25 | $25 | |
| A | | | | PRESSED | | | |
| B | PRESSED | $25 | $25 | PRESSED | $25 | $25 | |
| B | | | | PRESSED | | | |
| C | PRESSED | $25 | $25 | PRESSED | $25 | $25 | |
| C | | | | PRESSED | | | |
| D | PRESSED | $25 | $25 | PRESSED | $25 | $25 | |
| D | | | | PRESSED | | | |
| E | PRESSED | $25 | $25 | PRESSED | $25 | $25 | |
| E | | | | PRESSED | | | |
| F | PRESSED | $25 | $25 | PRESSED | $25 | $25 | |
| F | | | | PRESSED | | | |
| G | PRESSED | $0 | $0 | PRESSED | $0 | $0 | |
| G | | | | PRESSED | | | |
| COIN | PRESSED | | | | | | |

| | REQUESTED | | | ACTUAL | | | |
|---|---|---|---|---|---|---|---|
| ACCOUNT | STATE | BALANCE | EVENT AMOUNT | STATE | BALANCE | EVENT AMOUNT | COMMENT |
| A | STAMPED | $25 | $25 | STAMPED | $25 | $25 | |
| A | | | | STAMPED | | | |
| B | STAMPED | $25 | $25 | STAMPED | $25 | $25 | |
| B | | | | STAMPED | | | |
| C | STAMPED | $25 | $25 | STAMPED | $25 | $25 | |
| C | | | | STAMPED | | | |
| D | STAMPED | $25 | $25 | STAMPED | $2.50 | $2.50 | 10% MERCHANT DISCOUNT |
| D | | | | STAMPED | | | |
| E | STAMPED | $25 | $25 | STAMPED | $25 | $25 | |
| E | | | | STAMPED | | | |
| F | STAMPED | $2.50 | $2.50 | STAMPED | $0.30 | $0.30 | $0.30 FLAT FEE |
| F | | | | STAMPED | | | |
| C | STAMPED | $22.20 | $22.20 | STAMPED | $22.20 | $22.20 | |
| B | STAMPED | $22.20 | $22.20 | STAMPED | $22.20 | $22.20 | |
| G | STAMPED | $2.80 | $2.80 | STAMPED | $2.80 | $2.80 | |
| G | | | | STAMPED | | | |
| COIN | STAMPED | | | | | | |

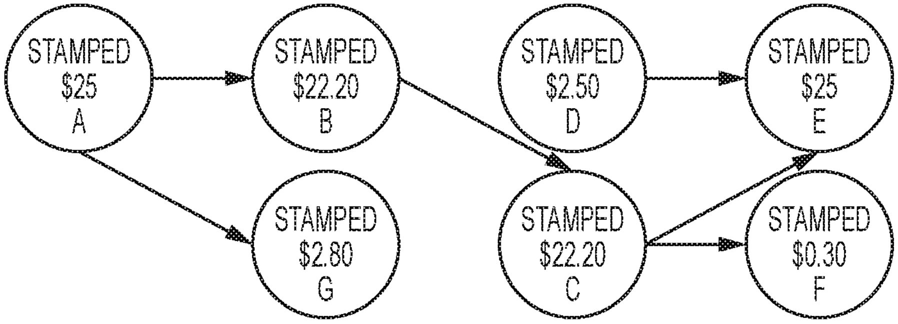

FIG. 16

| | REQUESTED | | | ACTUAL | | | |
|---|---|---|---|---|---|---|---|
| ACCOUNT | STATE | BALANCE | EVENT AMOUNT | STATE | BALANCE | EVENT AMOUNT | COMMENT |
| A | CIRCULATED | $25 | $25 | CIRCULATED | $25 | $25 | |
| A | | | | CIRCULATED | | | |
| B | CIRCULATED | $22.20 | $22.20 | CIRCULATED | $22.20 | $22.20 | |
| B | | | | CIRCULATED | | | |
| C | CIRCULATED | $22.20 | $22.20 | CIRCULATED | $22.20 | $22.20 | |
| C | | | | CIRCULATED | | | |
| D | CIRCULATED | $2.50 | $2.50 | CIRCULATED | $2.50 | $2.50 | 10% MERCHANT DISCOUNT |
| D | | | | CIRCULATED | | | |
| E | CIRCULATED | $25 | $25 | CIRCULATED | $25 | $25 | |
| E | | | | CIRCULATED | | | |
| F | CIRCULATED | $0.30 | $0.30 | CIRCULATED | $0.30 | $0.30 | $0.30 FLAT FEE |
| F | | | | CIRCULATED | | | |
| G | CIRCULATED | $2.80 | $2.80 | CIRCULATED | $2.80 | $2.80 | |
| G | | | | CIRCULATED | | | |
| COIN | CIRCULATED | | | | | | |

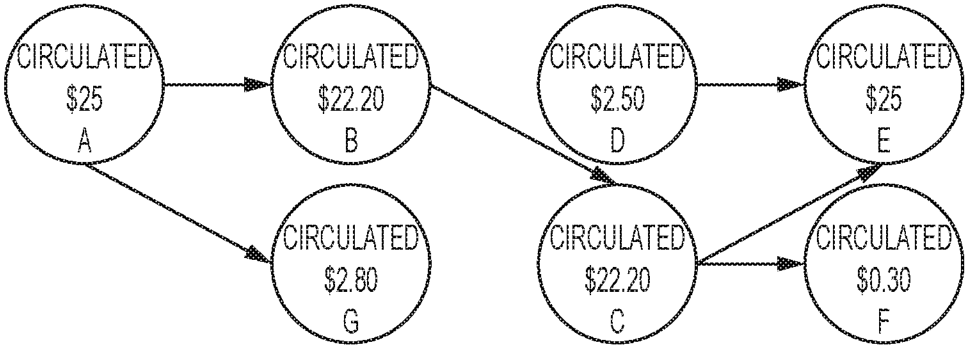

FIG. 17

| | REQUESTED | | | ACTUAL | | | |
|---|---|---|---|---|---|---|---|
| ACCOUNT | STATE | BALANCE | EVENT AMOUNT | STATE | BALANCE | EVENT AMOUNT | COMMENT |
| A | CERTIFIED | $25 | $25 | CERTIFIED | $25 | $25 | |
| A | | | | CERTIFIED | | | |
| B | CERTIFIED | $22.20 | $22.20 | CERTIFIED | $22.20 | $22.20 | |
| B | | | | CERTIFIED | | | |
| C | CERTIFIED | $22.20 | $22.20 | CERTIFIED | $22.20 | $22.20 | |
| C | | | | CERTIFIED | | | |
| D | CERTIFIED | $2.50 | $2.50 | CERTIFIED | $2.45 | $2.45 | OUR DISCOUNT ESTIMATE WAS A LITTLE OFF |
| D | | | | CERTIFIED | | | |
| E | CERTIFIED | $25 | $25 | CERTIFIED | $25 | $25 | |
| E | | | | CERTIFIED | | | |
| F | CERTIFIED | $0.30 | $0.30 | CERTIFIED | $0.30 | $0.30 | $0.30 FLAT FEE |
| F | | | | CERTIFIED | | | |
| C | CERTIFIED | $22.25 | $0.05 | | | | |
| C | | | | CIRCULATED | | | |
| C | CIRCULATED | $22.25 | $0.05 | CIRCULATED | $22.25 | $0.05 | |
| C | | | | CIRCULATED | | | |
| COIN | CIRCULATED | | | | | | |

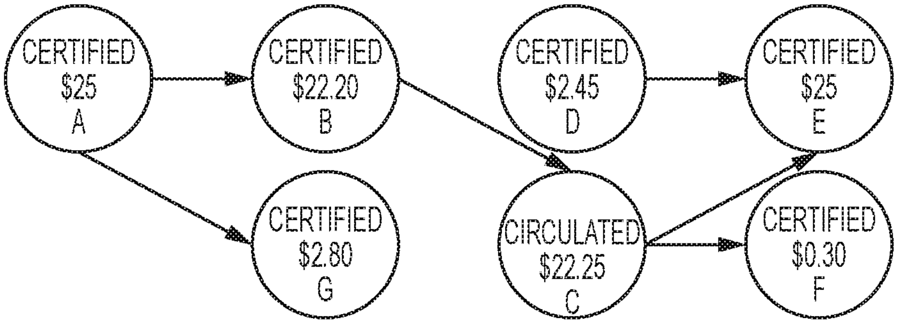

FIG. 18

| | REQUESTED | | | ACTUAL | | | |
|---|---|---|---|---|---|---|---|
| ACCOUNT | STATE | BALANCE | EVENT AMOUNT | STATE | BALANCE | EVENT AMOUNT | COMMENT |
| B | CIRCULATED | $22.25 | $0.05 | CIRCULATED | $22.25 | $0.05 | |
| B | | | | CIRCULATED | | | |
| G | CIRCULATED | $2.75 | -$0.05 | CIRCULATED | $2.75 | -$0.05 | |
| G | | | | CIRCULATED | | | |
| COIN | CIRCULATED | | | | | | |

| ACCOUNT | REQUESTED | | | ACTUAL | | | |
|---|---|---|---|---|---|---|---|
| | STATE | BALANCE | EVENT AMOUNT | STATE | BALANCE | EVENT AMOUNT | COMMENT |
| B | CERTIFIED | $22.25 | $0.05 | CERTIFIED | $22.25 | $0.05 | |
| B | | | | CERTIFIED | | | |
| C | CERTIFIED | $22.25 | $0.05 | CERTIFIED | $22.25 | $0.05 | |
| C | | | | CERTIFIED | | | |
| G | CERTIFIED | $2.75 | -$0.05 | CERTIFIED | $2.75 | -$0.05 | |
| G | | | | CERTIFIED | | | |
| COIN | | | | CERTIFIED | | | |

| | REQUESTED | | | ACTUAL | | | |
|---|---|---|---|---|---|---|---|
| ACCOUNT | STATE | BALANCE | EVENT AMOUNT | STATE | BALANCE | EVENT AMOUNT | COMMENT |
| A | ENCASED | $25 | $25 | ENCASED | $25 | $25 | |
| A | | | | ENCASED | | | |
| B | ENCASED | $22.25 | $22.25 | ENCASED | $22.25 | $22.25 | |
| B | | | | ENCASED | | | |
| C | ENCASED | $22.25 | $22.25 | ENCASED | $22.25 | $22.25 | |
| C | | | | ENCASED | | | |
| D | ENCASED | $2.45 | $2.45 | ENCASED | $2.45 | $2.45 | |
| D | | | | ENCASED | | | |
| E | ENCASED | $25 | $25 | ENCASED | $25 | $25 | |
| E | | | | ENCASED | | | |
| F | ENCASED | $0.30 | $0.30 | ENCASED | $0.30 | $0.30 | |
| F | | | | ENCASED | | | |
| G | ENCASED | $2.75 | $2.75 | ENCASED | $2.75 | $2.75 | |
| G | | | | ENCASED | | | |
| COIN | ENCASED | | | | | | |

COIN OPERATED DIGITAL PAYMENTS HUB

CROSS REFERENCE TO RELATED APPLICATIONS

This application is a continuation of U.S. patent application Ser. No. 17/567,660 filed Jan. 3, 2022, which issued as U.S. Pat. No. 12,118,542 on Oct. 15, 2024, which is a continuation of U.S. patent application Ser. No. 15/697,145, filed Sep. 6, 2017, which issued as U.S. Pat. No. 11,216,805 on Jan. 4, 2022; which claims the benefit of U.S. Provisional Patent Application No. 62/384,838, filed Sep. 8, 2016, entitled "COIN Operated Digital Payments Hub," the contents of which are hereby incorporated in its entirety.

TECHNICAL FIELD

The present disclosure is directed payment processing, and more particularly to bi-directional translation and resolution systems and methods.

BACKGROUND OF THE INVENTION

Banks, retailers, and other entities in today's economy must be able to accept or facilitate payments from a variety of digital sources and fiat hard currencies (or non-fiat digital currencies). This means that almost in every payment transaction between a payor and a recipient there can be multiple entities or companies involved in a single purchase. In addition to the multiple parties involved in any individual payment transaction, each company may have different accounting systems, techniques, and protocols. Ensuring that each party is correctly paid or made whole in a timely manner can be difficult. These types of situations, and others like it, can be difficult to track from an accounting perspective.

In addition to the complexity seen in existing (also called legacy) systems, swift change has come at a rapid pace across a wide-ranging set of elements throughout the payments business. From technology advancements in plastic cards (the addition of chips replacing magnetic stripes on the back of cards), to mobile payments driven by the overwhelming adoption of "smartphones" (internet connected miniaturized computers) and devices to tokenization, the industry is becoming even more complex. Examples abound of this complexity and new use cases are created every day.

As an example, we can review the purchase of a sandwich at a restaurant. The consumer hands the cashier a credit or a debit card, and the consumer is given a sandwich. The transaction may appear simple, but there's a lot going on behind the scenes. First, the accounts involved. There's the consumer credit or debit card. A credit card (and a debit card) are a promissory mechanism used by the consumer to tell the merchant that they agree to pay the amount required for the sandwich so no exchange of actual usable funds happen in the interaction above. The merchant has hired a company (called a merchant acquirer) to get the money from the consumer's bank and to make sure that it arrives at the merchant's operating account at their bank (referred to as the merchant or acquiring bank). When the cashier swiped the credit card, the card information was sent to their merchant acquirer. Their merchant acquirer checked a lot of things: If the card number is valid, if the card is restricted for use (by the government or for a specific type of merchant like a liquor store), if the purchase looks like a fraudulent transaction (may be this is the 500th sandwich today or is being made in a country far away from where the consumer is registered to live). If the merchant acquirer decides it's okay for the consumer to be making the purchase, they then check to make sure the consumer has the bank's authorization to actually spend the funds (the consumer could have exhausted their credit on a previous purchase or may not have enough money in their accounts to cover the cost of the purchase). If the consumer's bank provides authorization, they add that purchase amount to the credit balance of the consumer in the case of a credit card or reserve the amount of the purchase in the account of the consumer so it cannot be used for another purpose for a debit card. The messages that go between the merchant acquirer and the consumer's bank use a protocol determined by the network responsible for the card's issuance by the consumer's bank. For example (in the United States) these would be Visa™, MasterCard, American Express™ or a similar network. These networks define and standardize the end to end communication protocols used by the merchant acquirer all the way to the consumer's bank. When everything works as designed and the consumer has the necessary funds, the flow of messages initiated by the "swipe" of the credit/debit card at the merchant results in a final message to the merchant saying "this card has an authorization for the sandwich amount". By the rules that the networks have established, this all has to happen in less than three seconds. But the transaction is not necessarily over. The consumer might want to add a tip or take some additional action that requires the merchant to go back to their acquirer and says, in effect, "they actually bought the sandwich for $x". After all of those messages back and forth between the merchant and the consumer's bank, the merchant still hasn't been paid. Days (or weeks) later, the consumer's bank will eventually get the funds to the merchant's bank (often because the money goes to the acquirer's bank before it ends up at the merchant's bank). This process also has an embedded fee structure at every message hand-off meaning that the merchant will receive a discounted amount (representing around 2% of the total purchase price) from the price the consumer paid. After all these steps, the consumer has the right to come back to the merchant (days, weeks or even months later and dispute the purchase (reasons could include fraud as well as a list of other acceptable reasons).

Now, imagine that a consumer wants to use a gift card, credit card, and a coupon for that very same purchase. Now there are three different kinds of payments messaging paths necessary to consummate the purchase. There might be roughly a dozen accounts involved in a scenario of this type (depending on the particular systems involved), that all move money at different times in different ways. Some of them might think in integer pennies, while others think in decimal dollars. Some of these transactions will inevitably get put in a batch of data that needs to be sorted out by someone else downstream. Every transfer will happen on a different timeline, and there may be money moving ahead of other money because of this. As this complexity increases in an individual payment scenario or (more generally) across the payments industry opportunity for fraud or theft increase, more mistakes (superficial or catastrophic to a business) happen, companies see more actuarial complexity, tracking becomes costly for all parties, and consumer choice and convenience are derailed.

SUMMARY OF THE INVENTION

In a possible embodiment under the present disclosure a method can manage data about payment events. The method can include receiving data about a payment event including one or more of; a participant identifying data, one or more financial account numbers, one or more monetary amounts, and a status of the payment within the external payment system. The data can be stored in a database in a predetermined structure. Then the data can be processed, including: determining the number of accounting ledgers involved in the payment event; creating one or more transaction accounts within the predetermined structure; making ledger entries in the one or more transaction accounts from one or more monetary amounts in the data; and determining whether the one or more transaction accounts balance according to double entry accounting. The method can maintain a transaction status to reflect a status of each external payment system and each associated ledger entry and also encrypt a portion of said data if the portion is determined to be sensitive. A subset of the data can be communicated to a second external payment system. The method can monitor an updated status of the payment in the second external payment system and initiate notifications to the external payment system and other systems based on the transaction status.

Another possible embodiment under the present disclosure can comprise a system for managing data about payment events. The system can comprise one or more servers operable to receive data about a payment event including one or more of; a participant identifying data, one or more financial account numbers, one or more monetary amounts, and a status of the payment within the external payment system. The system can also comprise a vault operable to store said data within a database comprising a predetermined structure comprising a coin. A coin application programming interface can communicate with a payer and a payee related to a payment event. A source connector can communicate with a source payment system associated with the payer and a destination connector can communicate with a destination payment system associated with the payee. The one or more servers can process the data by: determining the number of accounting ledgers involved in the payment event; creating one or more coin accounts within the coin; making ledger entries in the one or more coin accounts from one or more monetary amounts in the data; and determining whether the one or more coin accounts in the coin balance using double entry accounting. The one or more servers can also: maintain a coin status to reflect a status of each external payment system and each associated ledger entry; encrypt a portion of said data if the portion is determined to be sensitive; communicate at least a subset of the data to a second external payment system; monitor an updated status of the payment in the second external payment system; and initiate notifications to the external payment system and other systems based on the coin status.

Another possible embodiment under the present disclosure can comprise a system for resolving financial accounts related to a financial transaction. The system can comprise a hub operable to communicate with a plurality of distinct external financial systems related to a payment event. The hub can comprise an application programming interface operable to receive communications from a payee device and a payer device; a source connector operable to transmit instructions to a source payment system for the transfer of money from a payer bank account to a payee bank account; and a destination connector operable to transmit instructions to a destination payment system for the reception of money from the payer bank account to the payee bank account. The hub can be operable to receive notification of the payment event; associate the payment event with a payment event format; create a transaction ledger according to the payment event format; maintain a status of the transaction ledger; receive one or more updates on the status of the transaction ledger from the plurality of distinct external financial systems; apply a status change to the transaction ledger, wherein each status change results in a transaction ledger that is balanced from an accounting perspective; and store information regarding a plurality of payment events.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 9 is a table diagram of a COIN transaction under the present disclosure;

FIG. 10 is a table diagram of a COIN transaction under the present disclosure;

FIG. 11 is a table diagram of a COIN transaction under the present disclosure;

FIG. 13 is a flow-chart and table diagram of a COIN transaction under the present disclosure;

FIG. 16 is a flow-chart and table diagram of a COIN transaction under the present disclosure;

FIG. 17 is a flow-chart and table diagram of a COIN transaction under the present disclosure;

FIG. 18 is a flow-chart and table diagram of a COIN transaction under the present disclosure;

DETAILED DESCRIPTION OF THE PREFERRED EMBODIMENTS

Figure 1A:
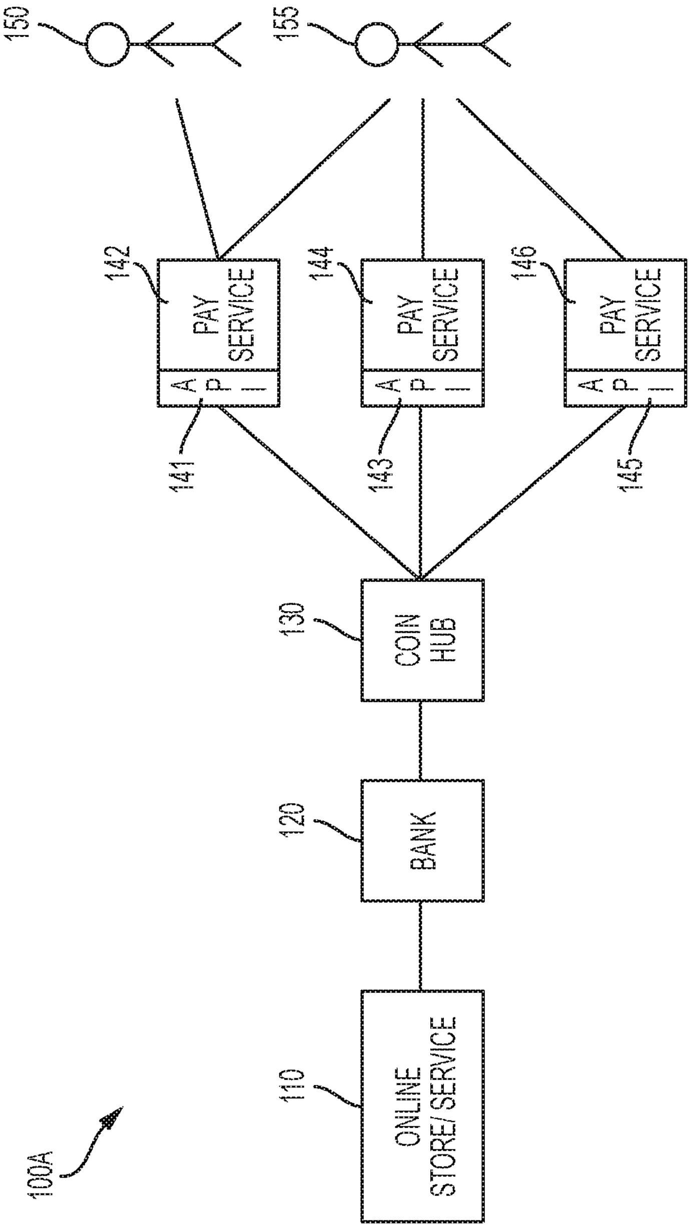
FIGS. 1A-1B are diagrams of possible system embodiments under the present disclosure.

A payment involves at least two, and often many more participants (once you factor in the various kinds of payments systems that exchange data in the middle of the endpoints). Payments participants conduct business with each other via the exchange of payment event data and then by the movement of money. Payment event data is unique from most other kinds of data. These unique qualities include: (a) special requirements for security; (b) being used within financial systems as the basis for accounting; (c) being embedded within the most important businesses processes of every business; and (d) never being owned or managed just by a single party. Payment systems are optimized to process payment requests within their own systems efficiently and then engage outside systems using multiple formats of payment event data to actually move the money (or assets) after the fact. But the exchange between those systems run into inefficiency (friction) due to the different handling of payment event data between those systems. Over the last fifty years, banks and processors have invested significant amounts of money in addressing the core function of money movement and not as much the inefficiency related to payment data loss in that exchange. Now the payments industry has seen an explosion of new entrants in the industry creating significant numbers of new payment event data formats and thereby increasing the industry problem.

It is therefore difficult to engage new, different, and varied payments systems globally, even when it makes business sense to do so. It can be difficult to securely conduct payments with parties that a company or individual doesn't know very well, particularly in new digital channels. It can be difficult to reconcile a payment back in context of a purchase, business relationship, or other commercial activity leading to duplicate efforts and resources. In addition, existing payments systems and associated payments networks are difficult to change. Connecting new digital payments experiences to existing payments systems is highly complex both technically and operationally, and very challenging to perform securely, particularly while abiding by applicable compliance rules and regulations and avoiding fraudulent behavior. Furthermore, many new digital payments experiences require new patterns of payments transactions that function in novel ways and exacerbate this challenge, which include aggregate transactions, multi-party transactions, multi-network transactions, just-in-time funding or delivery, split funding and split tender transactions. The present disclosure describes a platform, referred to as a COIN payment event data hub, to securely facilitate these connections between payments systems, and new digital experiences. As used herein, a COIN is a unique or nearly unique identifier that is used to associate together a series of operations into a complete transaction. A COIN can serve as a transaction ledger, translation hub, transaction server, and other functionality. The COIN represents the COIN accounts, connectors, financial transactions, and status of a financial transfer from a set of sources to a set of destinations. A "COIN account" can refer to an individual representation of an account of one party to a payment event within the context of a COIN that can represent the entire transaction. A single COIN can comprise multiple COIN accounts because a financial transaction involves multiple parties. The COIN may be specific to a set of participants using a payment system associated with the COIN. The COIN may also be specific to a certain time and/or location, for example the COIN may only be valid for the 30 minutes after a user enters a store. The COIN may be flexible based upon rules and event driven designs that may be configured to support multiple use cases. Further the COIN may contractually bind together one or more participants, merchants, locations, and funding accounts. A COIN account (out of multiple possible COIN accounts on a single COIN) models a real world financial account or proxy for an account (such as a credit card). Usually the COIN account only models a subset of the account (the account as it participates in a transaction) as opposed to the full value of and all activity on an account.

One purpose of the COIN operated payment event data hub is to enable bi-directional connections to existing payments systems using native semantics via their existing external interfaces. The digital payment hub can deliver a composite or "meta" payments transaction management service powered by the COIN transaction. The COIN can comprise a defined workflow of payments instructions and associated accounting and validation rules which facilitates the movement of value between arbitrary sources and destinations which have been connected to the hub, or system. These COIN money movement transactions are stimulated by requests to a restful API (application programming interface) in order to allow developers of digital payments experiences to control the initiation of money movement, receive updates as to the status, and request any associated resolution of, money movement transactions between arbitrary sources and destinations. The payment events data hub securely stores the information associated with money movement in an internal cryptographically secured storage facility.

A COIN can track a given financial transaction and all the related transfers required to make this transaction happen. The COIN can also confirm that the funds at issue in a transaction: 1) can be transferred (from a compliance standpoint); 2) can be transferred (from an available funds standpoint); 3) has been requested to be transferred; 4) has actually been transferred; and 5) hasn't been disputed/refunded/etc. COINs preferably track individual financial transactions. They preferably do not track or manage accounts over time, such as a bank account.

One embodiment of a COIN payment event data hub under the present disclosure can be seen in FIG. 1A. System 100A shows the connections between various parties to an online purchase made by users 150 or 155 from an online store or service 110. A purchase could be a digital file such as a movie or song. Embodiments are not limited to the online environment and store 110 could be a physical location. When the purchase is made by a user 150, the user will provide information for a pay service 142 to pay for the item. Payment service provider 142 can be an online payments service provider such as Paypal™ or AliPay™. There must be some mechanism by which the pay service 142 authorizes a deduction from the user's bank account with bank 120, and directs the money to store 110. Banks have typically run into complications during this process because they need to communicate with a variety of pay services 142, 144, 146 for various users 150, 155. One improvement under the present disclosure is a COIN payment event data hub 130 which can handle all communications, translations, resolution, mediation, and other functions, between the pay services 142, 144, 146 and the banks 120 and stores 110 in a bi-directional or multi-directional manner. In other embodiments, the COIN hub can talk directly to store 110 and users 150, 155. Hub 130 can comprise one or more servers that can store a digital representation of each transaction in which the hub 130 participates. The digital representation and associated transactions, protocols, accounts, and settings can be referred to as a COIN, and can represent an entire accounting for all payments related to a transaction, all totaling up to zero, showing that all parties to a transaction have been accounted for and made whole. The COIN can also comprise instructions and money flow paths for each third party system to follow in the reconciliation process.

Figure 1B:
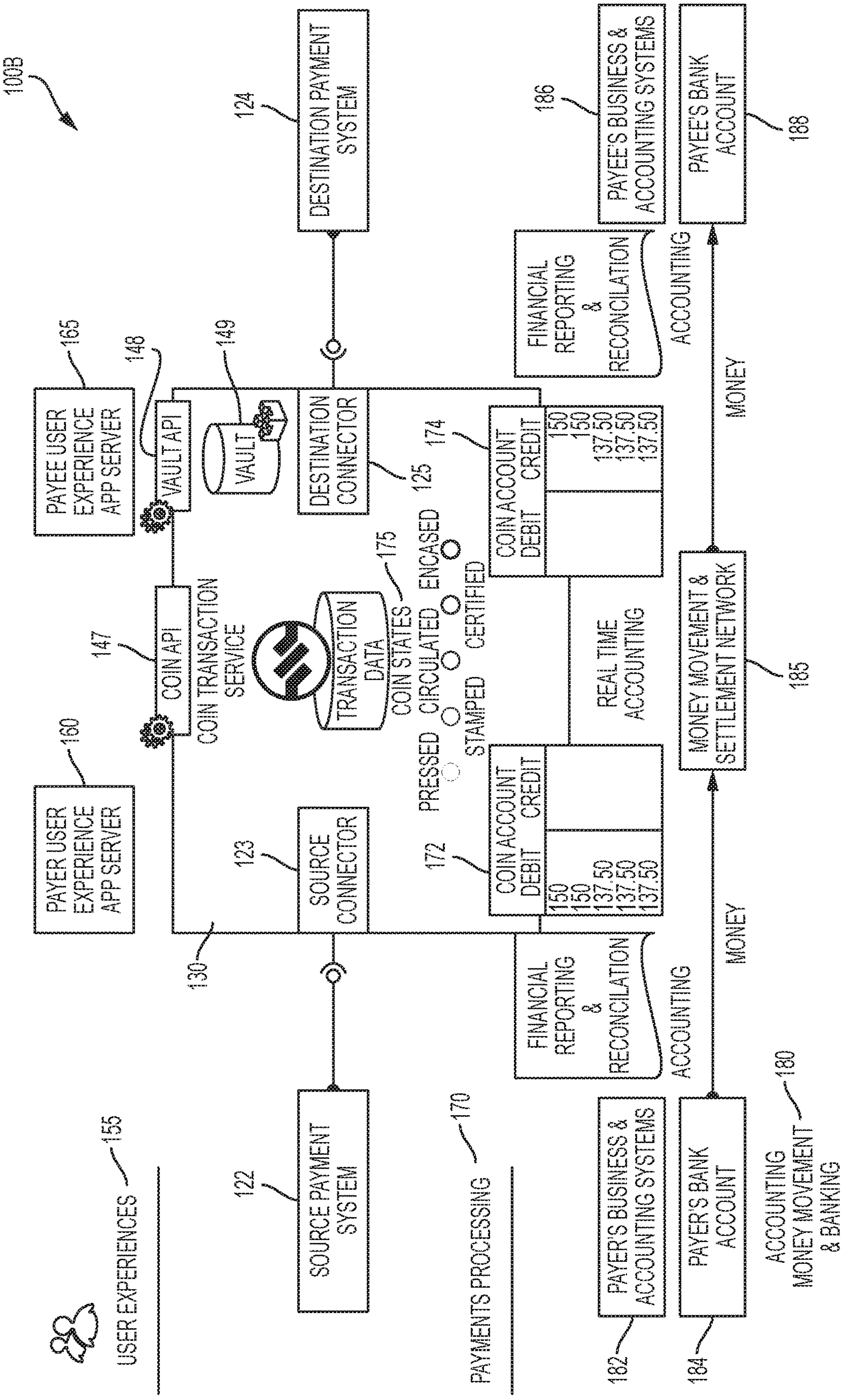

Another embodiment showing similar aspects and functionality as shown in FIG. 1A, can be seen in FIG. 1B. System 100B comprises a COIN payment event data hub 130, similar to the hub of FIG. 1A. Element 155 generally denotes the user experience side of system 100B, while 180 generally denotes the money movement side of system 100B. App server 160, 165 may allow a user (payer or payee) to interact with hub 130 via an application programming interface such as COIN API 147 or vault API 148. Vault API 148 can allow user to view historical transaction data, or other stored data, in vault database 149. Source connector 123 can provide communication functionality with a source payment system 122, usually the payment account or system of the payer. Destination connector 125 can provide communication functionality with a destination payment system 124, usually the payment account or system of the payee. A given status change between one of the COIN states 175, can involve an accounting change from a debit 172 to a credit 174. This can adjust the status of a COIN associated with a financial transaction. The movement of funds associated with the transaction can occur generally at money movement 180. The payer's business or accounting systems, often associated with the source payment system 122 and a payer, can interact with a bank account 184 to engage a money movement and settlement network 185 to accomplish the transfer of funds to the payee's bank account 188 which interacts with the payee's business and accounting systems 186. The transfer of money can be accomplished through protocols and means communicated or supplied to the payer (and his systems and accounts 122, 160, 182, 184) and the payee (and his systems and accounts 124, 165, 186, 188) by the CTS 130 via connectors 122, 125.

Via COIN transactions, highly disparate payments systems can be combined to create new emergent payments flows. Such payments flows may not be directly supported by any of the underlying payments systems, and exist only via coordinated interactions and translations between those systems as defined by the COIN. The COIN manages the full lifecycle of the underlying payments transactions, from initiation through funds movement and settlement, and finally past the point of repudiation. Operational behavior for exceptions, disputes, and settlement processes are at least as good as traditional "like to like" payments and include highly automated process mapping and management by the COIN. In most circumstances, operational issues are substantially more automated by using the system, as the COIN uniquely has the context of "both sides" of the transaction and can be defined to take workflow steps accordingly. Further, the system may have the ability to use a "hash" represented either in a link within an email or SMS or as a barcode or image on a phone, that enables the recipient to have no information about the sender and still be able to complete a money movement transaction.

Figure 2:
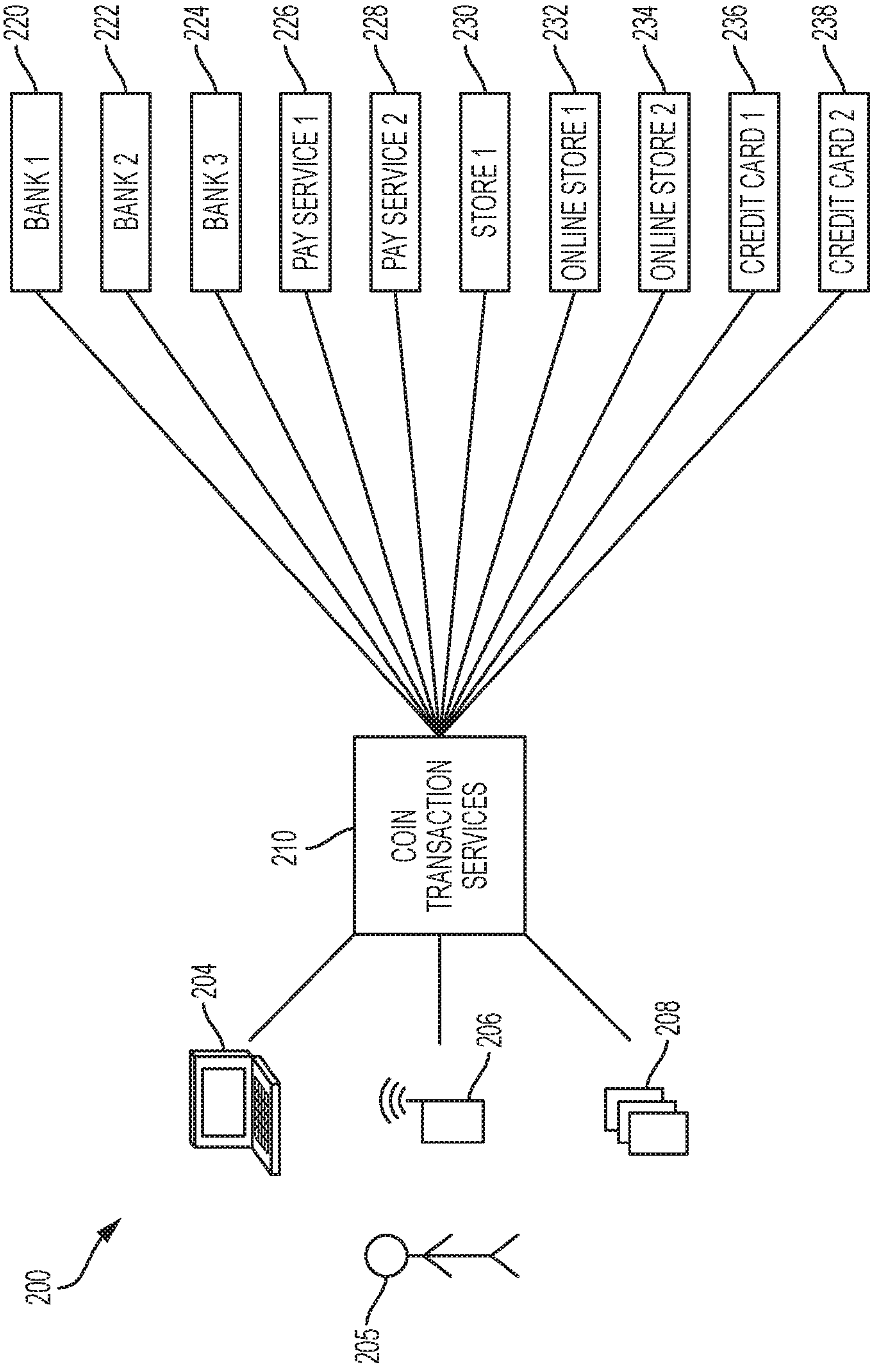
FIG. 2 is a diagram of a system embodiment under the present disclosure.

The COIN accounts created by the payment event data hub do not exist in any other system associated with a payment event. Payment events can include a purchase at a store, an online purchase, other types of purchases, exchanges of money, online transfers, and related events. While various banks, credit cards and other institutions may have records related to a specific payment event, the COIN account can maintain a record and instructions for data and money flow that does not exist in any other one location. By communicating with all the accounts and institutions involved in a payment event, the payment event data hub can provide translation, ledger, and storage capabilities unavailable to each external system. One benefit of the hub is that each external system does not have to update their own processes, software, APIs, and other functionalities when a third party changes their system or processes. For example, a bank may regularly transfer money to an online payment provider for purchases made by bank customers. The online payment provider may often update its processes and software for security of other reasons. Keeping up with these updates may be difficult for a bank. The hub, such as payment event data hub 130 of FIG. 1A, 130 of FIG. 1B, or CTS 210 of FIG. 2, can provide instructions or translations to the bank in the bank's own language or formatting so that the bank can continue sending money to the online payment provider. The CTS or hub can be updated or track the updates of all the related external or third party systems. This way the bank, for example, does not have to update its system when every single possible counter party to a payment event implements an update.

Payment systems often provide incomplete data about the payment events that they interact with, for a variety of reasons. In some cases, this is because additional data relevant to the payment becomes available later in the lifecycle of the payment. For example, a fee for a payment transaction service provider may depend on how many payment transactions occur in a given month or other time period. Therefore, the amount of that fee is only an estimate until a later date, such as after the end of the month and associated billing cycle for that provider. In another example, the payer, as one of the participants in the payment event, may disagree with the amount of the payment being requested for payment, and instead pay a different, lesser amount, often referred to as a short pay. These examples of different amounts are not the only such examples however. In some cases, the identity of participants (whether the payer or the payee), or their preferred providers (and associated methods of payments) is not known until after a payment event has begun. And as a result, the path, or route, by which the data about the payment is transmitted may not be determinable in advance, or the providers may have different data requirements, or provide different data in response to their transaction processing roles.

In a preferred embodiment, the COIN can allow for the determination of the simplest path for money movement and data flows between participants and their associated payment services providers, after the participants, and their providers have provided the data required to assemble that more complete data set. Such embodiment allows for the arrival of the data out of sequence, in some cases referencing only one payment system or participant of the multiples that may be involved in the payment event, and at any time that the data becomes available. The COIN can then associate the data with the overarching payment event, such that it can be referenced by all providers and participants for the complete data set.

In addition, payment systems (and/or associated financial accounts) generally do not have an overall perspective for all of the transactions that occur during a payment event. One payment system may be primarily interacting with the payer participant. Another may be interacting with the payee participant. As a result, data about the payment event can become fragmented and difficult to reconcile with ongoing interactions among the participants for such activities as refunds, returns, partial payments, disputes, exceptions, and errors.

In a preferred embodiment, the COIN can enable all participants and providers to interact with the COIN in order to communicate the state of their payment system or financial account with respect to the transaction, and to effect the communications necessary to make changes on other payment systems, without needing to be aware of the specific communications methods or interfaces required by those counterparty payment systems, nor needing to specifically direct the communication itself.

Embodiments of the system may include four key capabilities: COIN transaction services, secure credential storage, restful API Services, and payment system connectors.

COIN transaction services may allow a requestor (via the API) to initiate money movement between multiple disparate payments systems without needing to understand the complexities of the differences in syntax, semantics, state or workflows that may exist between those systems. An embodiment of a system 200 comprising COIN transaction services can be seen in FIG. 2. Servers 208 can interact with COIN transaction services 210 via any appropriate tool. In a preferred embodiment, servers 208 act on behalf of a user 205 or any of the parties 220-238. In some embodiments user 205 may interact through an application on a computer 204 or mobile device 206 for a more direct interaction with CTS 210. Servers 208 may interact with CTS 210 to move money between any of the parties listed 220-238, including banks, stores, pay services (such as Paypal™), online stores and other stores. CTS (COIN transaction server) 210 can store a COIN representing each transaction a user has. One transaction could involve using a debit card (from bank 222) to pay for an item at online store 232. Another transaction could involve directing a pay service 226 to pay for an item at online store 234. The use of pay service 226 may require a payment from credit card 238 to fund the pay service 226. A COIN transaction can also involve paying for an item at a physical store 230 using a COIN application on a smartphone or a COIN card or dongle. CTS 210 can comprise a well-defined finite state machine (more precisely, by a set of interlocking state machines) that represent the state of each payment system, as well as the aggregate state of all of the systems taken as a whole for this COIN transaction, or money movement request.

The CTS 210 can translate payments instructions and the state of payments instructions from disparate external payment systems 220-238 (using Connectors, described below) to a common set of semantics (aka the COIN). Benefits and capabilities of the CTS 210 include: normalizing different payment systems' life cycles (using COIN accounts, described below); monitoring and controlling disparate payment systems to keep them in sync, limiting operation to abide by a strict set of accounting based rules (using ledger real-time accounting) as defined within proof COINs; maintaining well defined state transition criteria that are decoupled from system of record transactions and have minimal conditional branching; having guarded interactions with systems of record via connectors that model the state of those systems of record directly into the real time accounting service; being either active or passive with respect to interactions with external payments systems (e.g. sending payments instructions, or receiving statuses from payments instructions initiated elsewhere); and providing a human interface via the Operator Admin Portal to interact with COIN transactions directly, for maintenance and error resolution. Proof COINs are templates or formats for creating COINs. They specify which COIN accounts and connectors to use and how money flows from account to account. A system of record is a financial system that is responsible (in a legally binding sense) for keeping track of money. If there are any legal disputes about the value of an account at any particular time, one should expect the courts to rule in favor of the system of record.

Other embodiments of a COIN system may include a secure credential vault. Secure credential vaults address the confidential nature of the credentials when interacting with payment systems, and dealing with confidential transaction information, such as personally identifying information or non-public information, or bank or card account numbers. A secure credential vault may describe both management of those information elements that have been classified as confidential by either the payment processing entity or one of entity's customers or partners, and also the overall security of the storage of application data by the system. Confidential information may be secured in flight using a public/private asymmetric RSA key pair, and confidential information may be stored securely at rest using AES symmetric encryption. Benefits and capabilities of the secure credential vault include: storing confidential information using AES (advanced encryption standard) symmetric key algorithms; encrypting the full database using associated database services (within RDS (relational database service)); assuring ACID (atomicity, consistency, isolation, durability) compliance with two phase commit; maintaining the relational structure for data required by the system; consolidating cryptographic functions in a single defined service (such as CryptoBuddy') for ease of maintenance; separation of concerns, and ability to leverage external cryptographic services; and limiting access to stored data to valid service requestor. The vault can be used for holding information about payment instruments (like credit card numbers, or PayPal' IDs), payment credentials (like Stripe' API credentials), or other assorted data.

Another aspect of the COIN system can include restful API services. Restful API services are the preferred means by which requests are made of the system. The COIN system can be compatible with a variety of user interface experiences. The restful API is a simple limited noun/verb API that enables a developer to request money movement services within the context of a COIN transaction. The COIN structure can abstract the underlying payment services complexity from the developer for the full lifecycle of those transactions. The API has nouns for COIN, account (of various kinds, such as card, digital network, bank, and others), people, and business. Benefits and capabilities of restful API services can include: defining simple noun/verb pairs for requesting services from COIN transaction service; providing secure authentication mechanism for requestors; securing payload of requests made through the API; and performing validation of API inputs, including scrubbing for malicious inputs.

Another aspect in some embodiments of the COIN system are payment system connectors. Connectors abstract external interfaces in a way that's more internally consistent, for easier consumption by COIN accounts. Connectors attempt to standardize error handling and return values and to adhere to a common interface for similar systems where possible (for example, multiple credit card acquirers would ideally implement the same connector interface). Payment system connectors are the preferred means by which the system interacts with external payments systems. The payment event data hub (such as element 130 of FIG. 1A, 1B or 210 of FIG. 2) may not be a system of record. It may not manage or "hold" value whether in transit or at rest. It also does not necessarily require the hub operator to assume any fiduciary responsibilities for the movement of money. The payment event data hub can require valid credentials to access each existing payment system to which it is connected via a payment system connector, and also require valid account information to be able to effectively process transactions. Such credentials can be provided to the operators (e.g. customers) of the system by the owners, operators or agents of the external payment system. Benefits and capabilities of payment system connectors can include: connecting to specified external interface of an existing payment system (as the system of record) for both debit (money out) and credit (money in) transaction support, including initiation, transaction management, settlement, and any after money movement support through non-repudiation; securely supporting the existing payment system authentication mechanism; mapping the inputs and outputs of the external payment system to the COIN transaction model; and providing the correct interaction mechanism for the existing payment system, whether request/response, file based, polling, or other interaction model.

Connectors can wrap a system of record so that the rest of the system can interact with it in a standard way. Connectors may be synchronous (real time), asynchronous, or some combination of both. They can take information about a payment instrument, such as a credit card, via a vault item object, and use this to move money onto and off of the payment instrument(s). Connectors preferably provide a method to validate that a vault item contains sufficient, valid data to interact with this connector. They should also preferably provide a method to guarantee that the account has good funds. Credit card authorizations are a great example of this directly from a system of record. Guarantees may also be reservations against other funds (such as escrows), and so the guarantee is created synthetically. They can also provide a method to move money from this account to some other account. This may be a pull taking money out of the account- or a push-putting money into the account. Some connectors may support both pulling and pushing. Some connectors may support specifying both sides of the transaction, while others may only allow moving money into or out of a predefined account. For example, a connector for a credit card acquiring system may only support capturing money off of a card and depositing the money into our bank account with the acquirer. Connectors can also provide: a method to check settlement status; a method to reverse a good funds guarantee (ex. cancel a credit card authorization); a method to refund money that has been moved (this may or may not be associated with a dispute, exception, or other payment process irregularity); and a method to manage a dispute or exception (that generally also moves money back if the dispute is settled in a fashion that results in a reversal of the payments process).

In a preferred embodiment, the methods of moving money (everything but validation) should be provided, at minimum, the following values: (i) the desired total amount to have guaranteed/moved/etc., after the API call is complete; (ii) the difference between the current total and the desired total (note that this may be negative for things like refunds); and (iii) the reference from the previous API call (if any) (where "previous" is defined by COIN account state transitions). In a preferred embodiment, the methods of moving money (everything but validation) should return, at minimum, the following values: (a) the current balance of the account after performing the requested action; (b) the amount the API responded with, if any, exactly how the API returned it; and (c) a unique reference for the API call, if any, from the API response.

A connector may provide multiple sets of functionalities. For example, it may be able to acquire from credit cards and push money to credit cards. Or it may be able to acquire credit cards, put money in bank accounts, and issue food stamps. It all depends on what the API supports. Each category of processing (ex. credit card acquiring) should have an interface that defines the methods the connector must implement in order to provide that functionality. An API may choose not to implement all of the required methods, or a method may not make sense for a particular type of financial system. In that case, the connector should always report that nothing happened (that there are no good funds, no money was refunded, etc.). If no API calls are made, the connector should not report a unique call reference or an API amount. The system should not hide the fact that nothing happened.

A COIN transaction can include an accounting or digital representation of a given transaction. During the process of performing the transaction and making sure all parties are paid or made whole, the representation, or the COIN, may pass through a number of states. COIN transactions are preferably managed by finite state machines that ensure that COINs meet certain criteria in order to transition from one state to another state. Transitioning state will preferably require the following conditions of a COIN: must be in balance; must represent good funds; must not allow any credit risk in the COIN (defined COIN accounts may accept credit or other risk); and represent the same state across all associated external payments systems within the COIN. COIN transactions preferably represent at least one source of funds and at least one destination of funds, using any authorized external payments systems for a given requestor.

Figure 3:
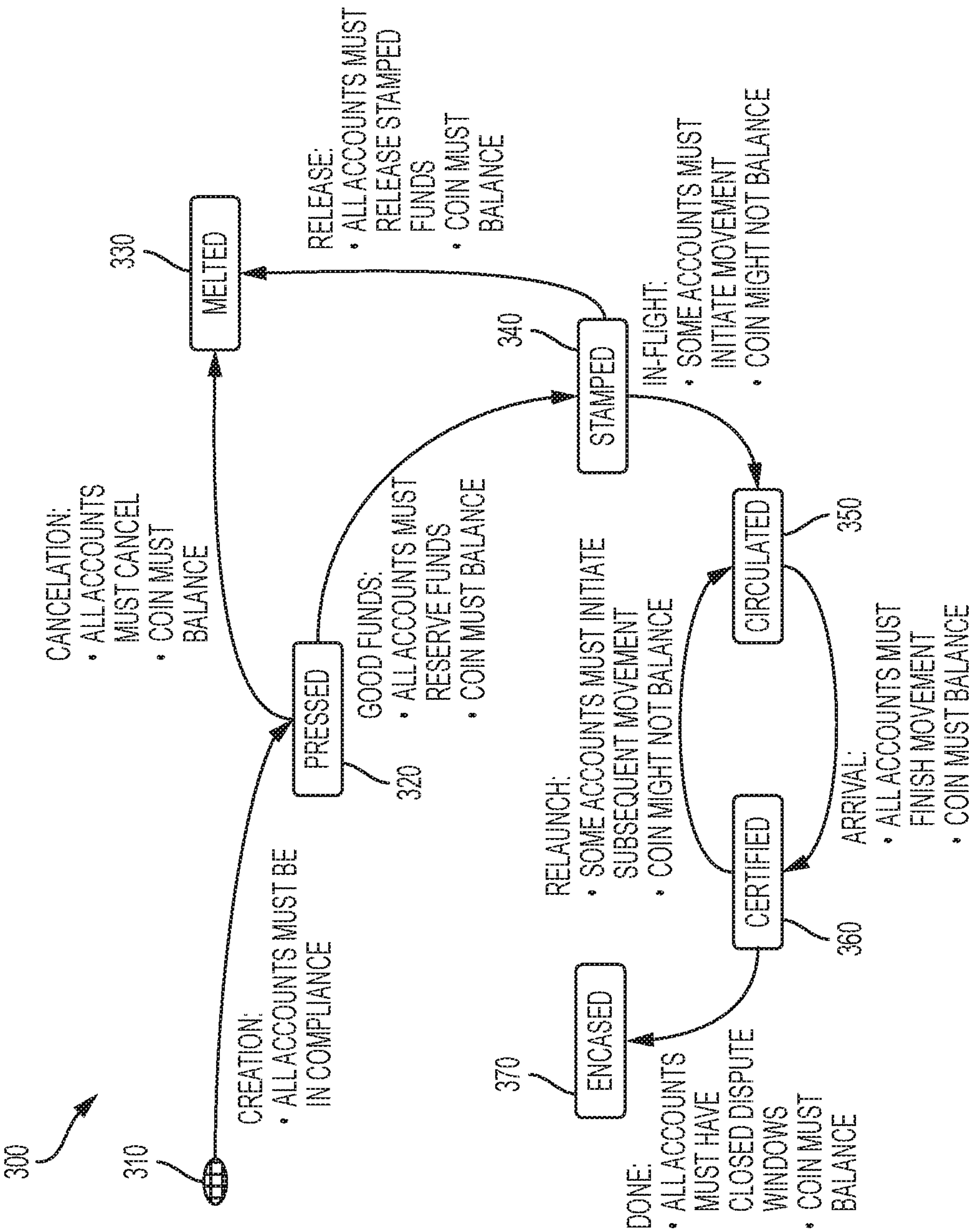
FIG. 3 is a flow-chart diagram of a method under the present disclosure.

FIG. 3 displays a possible embodiment of a COIN states model, shown as a flow chart 300. Beginning at 310, a COIN is created and at such creation all related accounts should be in compliance. When these steps are taken the COIN will have been pressed 320. When the related accounts have reserved funds and the COIN is balanced, then the COIN is stamped 340. From pressing, a COIN may pass to either melting 330 or stamping 340. A COIN is melted at 330 when a transaction or account is canceled. To be melted all accounts must cancel and the COIN should balance. From stamping 340, a COIN may pass onto circulation 350. At circulation, some related accounts must initiate movement, such as a transfer of funds, and a circulating COIN may not balance from an accounting perspective. If melted after stamping, the related accounts that initiated movement of funds must have their funds released from receiving parties and the COIN must balance. If the COIN is circulated 350, then the system will wait for movement on all funds to finish and for the COIN to balance. Once movement is complete and the COIN is balanced, then the COIN will be certified 360. After certification 360, it may be that further movement of funds is needed and the COIN is relaunched to be circulated again at 350. Subsequent movement may be needed for various reasons, some transfer of funds may have been dependent on a previous transfer, or a recalculation may vary the amounts due by each account. From certification 360, the COIN may also proceed to being encased 370. At encasing, all the related accounts must have closed dispute windows and the COIN must balance. Another shorthand way of describing each state is as follows. Pressed means that COIN participants are verified (e.g. terms agreed to, etc.). Stamped means that funds have been reserved or shown to be good funds (e.g. balance check, hold placed, etc.). Circulated means that fund movement has initiated (e.g. authorization has been captured, wire sent, etc.). Certified means that fund movement has finished (e.g. settlement, etc.). Encased means that fund movement is finalized (e.g. dispute window closed, etc.). Melted means that fund movement is canceled (e.g. authorization canceled, etc.). This state model can provide the means of normalizing the tracking of the COIN's view of the COIN accounts so that the COIN is able to treat each external transaction system in a consistent way with the details on differences handled by the COIN account implementations. The implementation of Pressed, Stamped, Circulated, Certified, Encased, and Melted states can allow the methods and systems that are being disclosed to work correctly with disparate financial systems that behave differently in accomplishing exchange of value or exchange of currency.

In preferred embodiments, COIN accounts are the subcomponents of the COIN that map directly to an external payments system. Every COIN preferably has a minimum of two COIN accounts (one as source and the other as destination). COIN accounts can be used to move money within COINs and may be an intermediary point for money movement. In other words, while every COIN account is preferably either a source or a destination for another COIN account, a COIN account may end up being a waypoint, rather than a final destination for money movement. Every COIN account has a list of transactions that have been performed against it either at the request of the system, or in response to some other stimulus, but recorded by the system. The sum of those transactions is the COIN account balance. During processing, a new transaction might be recorded against the COIN account thus changing the COIN account balance. During COIN state processing, we are traversing a map or graph of all the COIN accounts on the COIN in a specified order. FIG. 3 can be cyclic in representation meaning processing can loop around endlessly until a certain condition is met. There are at least three conditions that can halt the COIN processing loop: COIN account processing throws an exception; all COIN account processing in a column returns a 0 balance (no value with which to source the next column); or all COIN account balances become "stable."

Focusing on the third condition, a COIN account with a "stable" balance means a COIN account whose balance is the same after COIN account processing as it is before COIN account processing. Another way to look at it is that no new transactions were added against the COIN account due to COIN account processing. It is expected that the big, cyclic COIN processing is going to cycle through the COIN account until no new transactions need to be created.

Figure 4:
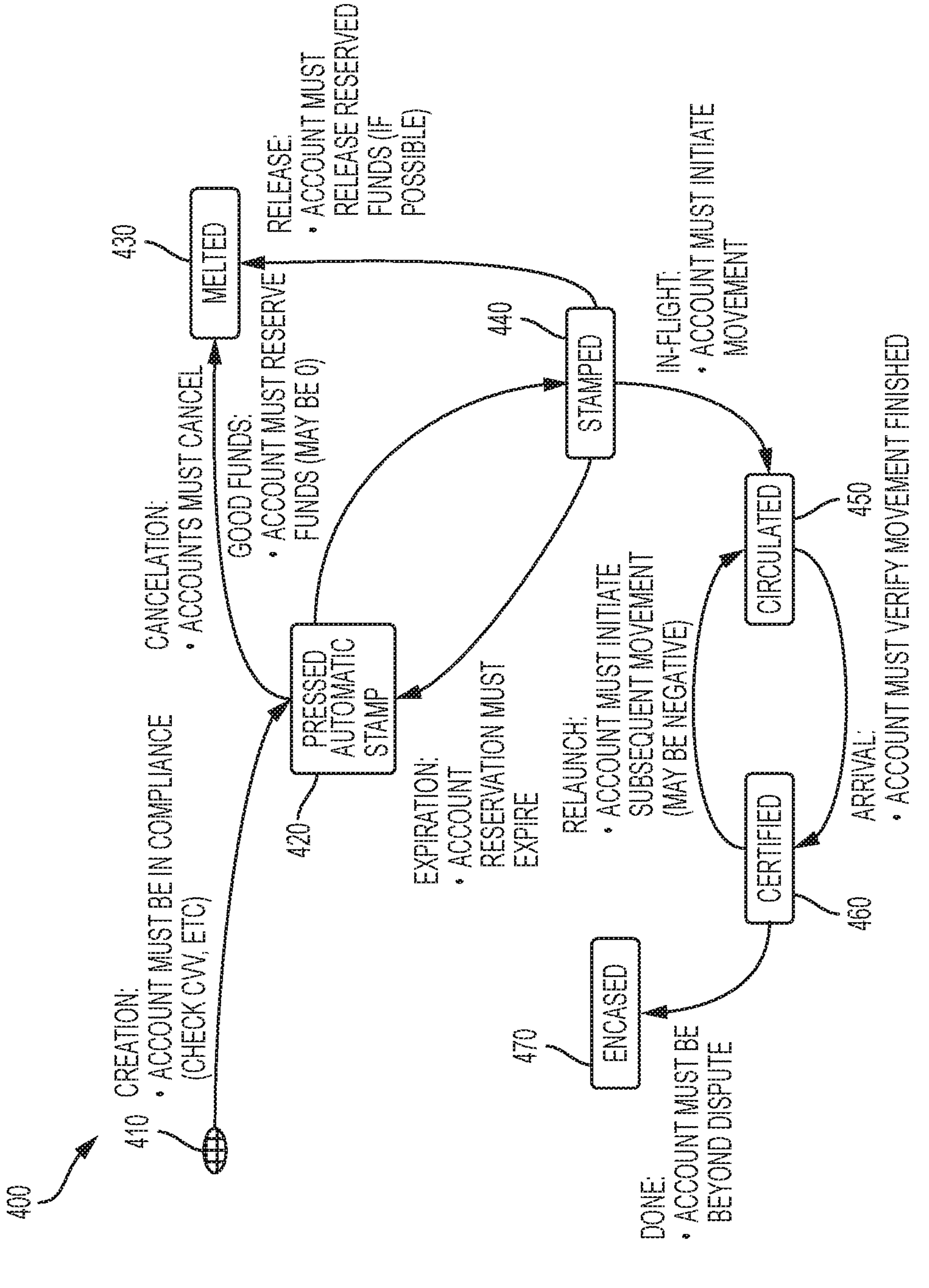
FIG. 4 is a flow-chart diagram of a method under the present disclosure.

FIG. 4 shows a flow chart diagram, similar to FIG. 3, of the COIN account model, but from an accounting perspective. FIG. 4 comprises an embodiment 400 with the same state labels (and very similar semantics) to the COIN state model. As shown in FIG. 4, the accounting states are similar to the COIN states of FIG. 3. One difference is that a stamped COIN at 440 may expire, in which case the COIN will have to be re-pressed at 420.

Figure 5:
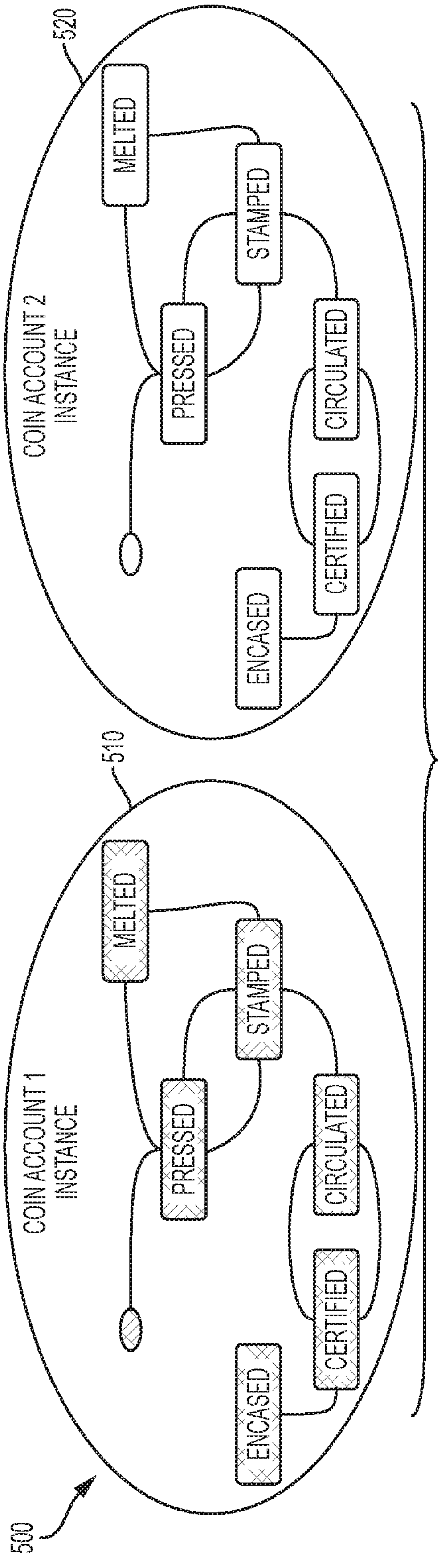
FIG. 5 is a flow-chart diagram of a method under the present disclosure.

Taken in tandem, the COIN state model and COIN account model enable an incredibly flexible means of interacting with highly diverse payments systems and modeling very complex money flows throughout their lifecycle, and with sophisticated dependencies. FIG. 5 displays a COIN instance with a single source 510 and single destination 520. Source 510 can refer to an instance of a first COIN account and destination 520 can refer to an instance of a second COIN account. Both the source 510 and destination 520 can be individual COIN accounts on a single COIN.

Figure 6:
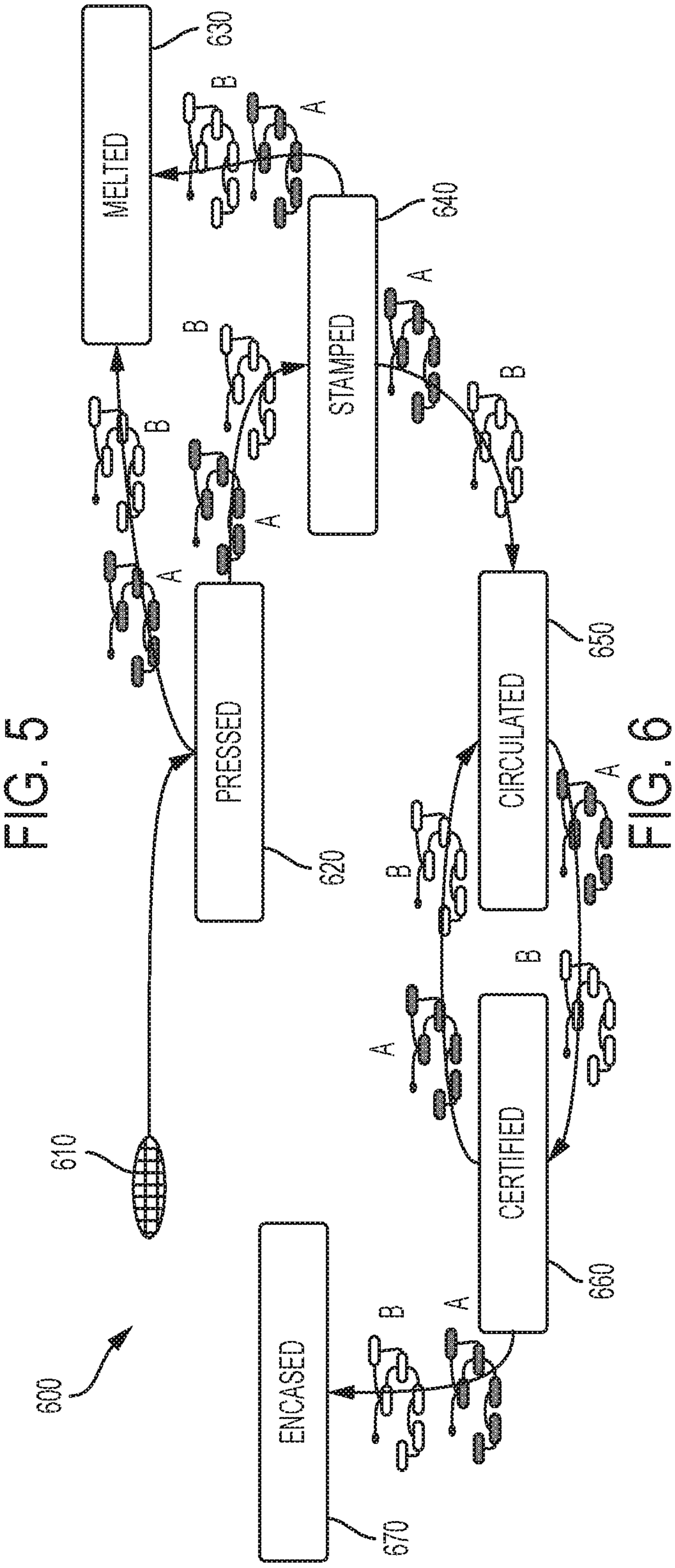
FIG. 6 is a flow-chart diagram of a method under the present disclosure.

Watching the transitions on the associated state diagrams through the lifecycle of a COIN might look something like that shown in FIG. 6. FIG. 6 shows a possible COIN embodiment annotated with the states shown in FIGS. 4 and 5: pressed 620, melted 630, stamped 640, circulated 650, certified 660, and encased 670. As the COIN moves from state to state, the first COIN account A will be determined, and the second COIN account B will be determined. Accounts A and B can refer to the first 510 and second 520 accounts shown in FIG. 5. FIG. 6 helps to show that moving from state to state will involve a series of accountings for multiple accounts. COIN runs state transition processing on its accounts until their balances stop changing. COIN advances as far as it can while still meeting state transition criteria. COIN both controls and is affected by COIN account state transitions.

Figure 7:
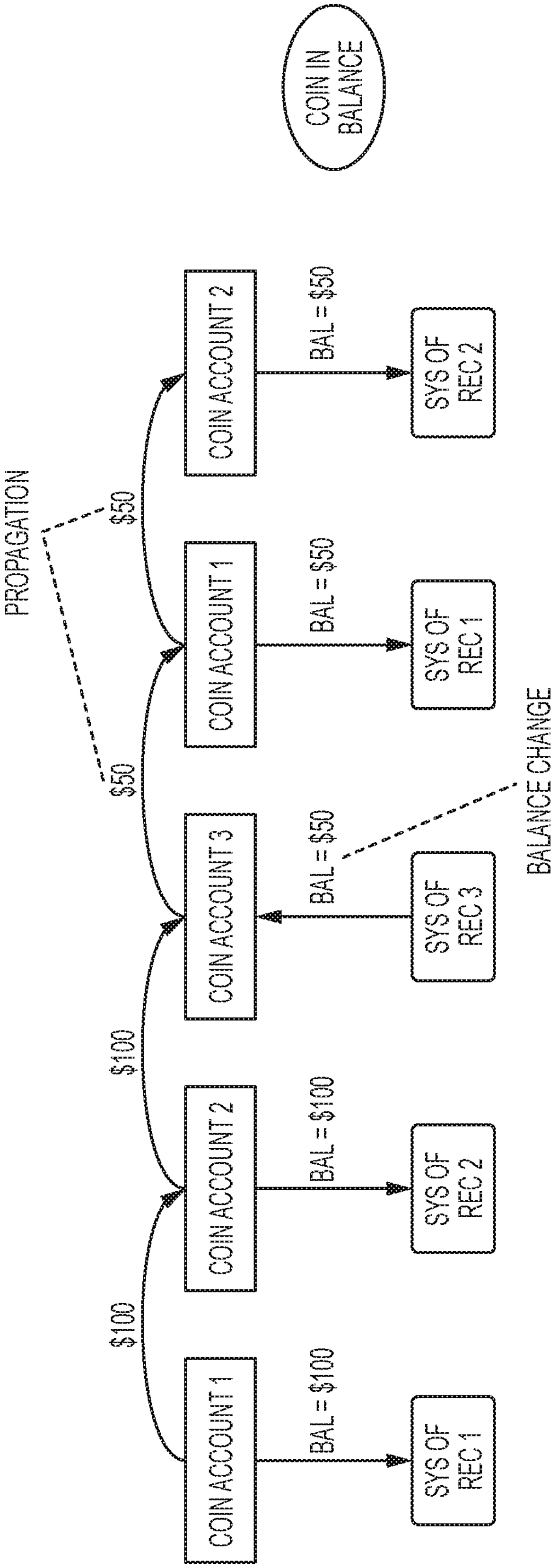
FIG. 7 is a flow-chart diagram of a method under the present disclosure.

Another possible embodiment or representation of COIN accounts and their associated external payments can be seen in FIG. 7. This example has three different COIN accounts and demonstrates how new balances propagate through the system. The three different COIN accounts can comprise separate accounts on a single COIN that represents the entire transaction. Systems of record 1, 2, and 3 can refer to external payment systems associated with each respective COIN account 1, 2, and 3. COIN account 1 can send $100 to COIN account 2, who then sends $100 to COIN account 3. COIN account 3 then sends $50 to COIN account 1, who then sends $50 to COIN account 2. At each step of the process the COIN is in balance. COIN account structures and workflows can be defined by proof COINs. Proof COINs can be defined and implemented at any time and deployed to one or more authorized service requestors.

A COIN account can track the progress of money flowing into and/or out of an actual financial account, like a bank account. It can also be used to model financial instruments, like credit cards, that are not technically accounts in themselves, but which are useful to model as distinct accounts. COIN accounts abstract multiple connectors for similar systems (ex. one account for multiple systems that acquire credit cards). They do this by defining an interface that connectors can implement if they provide a compatible service. COIN accounts are expected to interact with one connector per instance, but will support any connector that implements its interface. A COIN account interacting with multiple connectors indicates that the COIN account is trying to abstract multiple real-world accounts, which is discouraged, though possible. COIN accounts should model at most one real world account. In a preferred embodiment, COINs and COIN accounts are maintained and updated using double entry accounting.

A COIN account abstracts its connectors through a state machine. The state machine defines states that the COIN account can be in along with valid transitions between those states. The states are:

Null—The COIN account has just been created and may not even be fully defined in the database.

Pressed—The COIN account has been fully defined, and any credentials it requires (including vault items) are expected to work. This may require validating one or more sets of credentials. Authentication occurs at this state. Also, many payments systems have compliance functions that must be performed prior to generating payments instructions. Those functions should be completed during this state. The API credentials provided to this account (ex. via a vault item) are valid and can be used on this COIN with this account. This state often does nothing, but it must be used for connectors with credentials that are not always valid. Example 1: If the user must agree to transfer the funds, as with Paypal™, the request to agree should be sent in the Pressed state, with the user's acceptance/rejection being validated during the stamped state. Example 2: If the user's account can be enabled or disabled, the COIN account should ask the connector to check that the user's account is currently enabled. All fraud, risk, and compliance checks (such as anti-money laundering, sanctions, watchlist screening, and others) should be performed at this state.

Stamped—The COIN account has successfully attempted to acquire good funds (the equivalent of an authorization for credit cards). The phrase "successfully attempted" here is important, because an account can be stamped for $0. There are several circumstances in which this can happen, which will be described in more detail. Stamped indicates that the account has funds that are known to be available for use. However, the meaning of "known to be available" varies widely across financial systems and their implementations by third party APIs. A positive balance in this state means that the third party has guaranteed that, for a particular connector-specific duration, we will be able to capture, at minimum, the current stamped balance. Some systems may not explicitly provide this guarantee, but a contract with the third party may provide the guarantee that they can be charged for any funds that are unable to circulate normally. Thus, circulating stamped transactions may result in a failure, in whole or in part. This may be normal. However, if the system of record does not provide this guarantee (explicitly or contractually), then the connector (and thus COIN account) should report a stamped balance of 0. It is up to the COIN to decide what, if anything, to do in this situation. The stamped amount may also be 0 if the user has decided that they no longer wish to proceed with this transaction. This is known as "melting" a COIN, and is described in more detail below. In another example, the COIN account may be requested to circulate, but the stamp has expired. In this case, the COIN account should return that its state is pressed, and its next state is stamped. This correctly records that the account no longer meets the criteria to be stamped, and will let it run through stamp entry and processing logic again.

Circulated—The COIN account has successfully communicated any required money movement instructions. This is only an attempt to move money; The money may not move until much later (for example, ACH (automated clearing house) systems can take several days to actually move money). This is more a successful acknowledgment of the request than a verification of an actual transfer. Circulation means that money is being moved (unless the circulated amount is 0). A COIN should not circulate for more than the stamped value of the source(s), since one cannot guarantee that the other related accounts on the COIN will be able to provide/accept the additional funds necessary to balance your circulation. If you wish to increase the amount being circulated, you must first re-stamp for the increased amount. A negative difference in balance indicates a refund request, possibly due to disputes, unforeseen processing failures elsewhere, or a request to melt the COIN account. A connector may be unable to support negative circulation, in which case the COIN account must continue to report the same balance. It may also only be able to reduce its balance by some fraction of the amount requested. If a COIN account is requested to reduce its circulated balance, it must reduce its balance as far as possible, down to the requested new balance. If it is only capable of reducing its balance to an amount below that requested, it must not alter its balance. A COIN account may alter its balance in multiple stages—for example, by refunding and capturing again. However, it must be able to guarantee that it meets all the qualifications to be stamped for the balance being requested throughout the process. Example: If a COIN account has circulated $10, is now being requested to circulate $8, and can only refund the entire $10 (not the $2 requested), it may choose to refund the entire $10 and then circulate $8. This is valid only if it acquires a new guarantee of good funds for the $8 circulation, or if it can somehow use existing guarantees to achieve the same result (e.g. contractual guarantees, magic authorizations that can be recaptured against after refunding them, etc.).

Certified—The COIN account has verified with its system of record that the amount recorded as circulated was the amount that actually circulated (moved). This is often referred to as settlement. Note that the COIN account should perform settlement if it has ever had a non-zero circulated balance. Also, in some cases settlement may be verified by interacting with a different system of record. A COIN account that has been certified has verified with a system of record how much money actually moved during the circulated step(s). This is, by far, the most complicated state. Note that certification may require interacting with a different system of record to confirm that the funds are actually there (e.g. the balance of a bank account where funds were deposited as the result of circulation). The amount certified is expected to match the amount circulated, but it may differ for a number of reasons:

1. The amount circulated was just a guess, and the guess was wrong. This is particularly common for things like fee accounts that model things like credit card acquiring fees.
2. Someone disputed or refunded the money movement without notifying the hub/system, and some of the money was previously returned.
3. The settlement information was insufficiently detailed, and, as part of the attempt to distribute the value across the COINs, the hub/system incorrectly guessed that the amount changed due to another reason in this list.

4. 'There were fees that were unexpected and/or failed to model.
5. The external system moved the wrong amount of money.

Reasons 1 and 4 should be recorded and should not result in a change in the rest of the COIN (unless they can use this information to update their guesses, as in case 1). Reason 2 must result in an update to the COIN to reflect the amount of money actually moved. The requestor should be notified of the update. Reason 3 represents a bug in the system, so any other action may be taken depending on how the bug is interpreted. Reason 5 must not result in an update to the COIN. The COIN must not balance, and the third party needs to be contacted to resolve the discrepancy.

Encased—There is some duration in which the activity on this account can be disputed (the customer may dispute their charge, someone may report fraud, etc.). This state means that the time in which those disputes, refunds, or changes can occur has expired. Any money movement is now considered permanent for the transaction that was represented by the COIN. Any further money movement requires a new COIN. When money moves, there is a period (e.g. 90 days) in which the parties involved may dispute the money movement. If a dispute arises, this period may be extended until the parties resolve the dispute. During this period, the value circulated and/or certified may change multiple times. Once all disputes have been resolved and the transaction can no longer be disputed, the COIN account can be encased. Encased accounts cannot change state or value.

Figure 8:
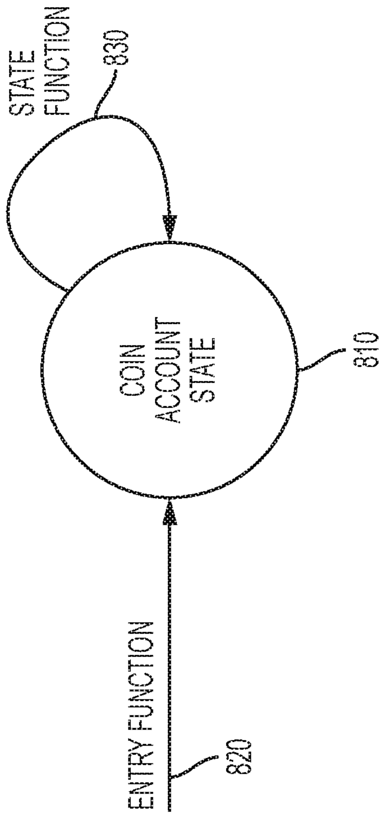
FIG. 8 is a flow-chart diagram of a method under the present disclosure.

When transitioning to a new state, the COIN account invokes a different function to enter the new state (the entry function) than if it transitions to its current state (the state function). This is modeled by the state machine diagram shown in FIG. 8. A COIN account may have a given account state 810. An entry function 820 was invoked to arrive at the current account state 810. A transition that returns the COIN account to its current state is a state function 830. Note that even if the entry function requests to move to the next state (bypassing the state function), the state function may still be called (and may be called multiple times). A COIN can comprise multiple COIN accounts as shown in FIG. 8 that each are undergoing different entry or state functions. The status or balance of the entire COIN can depend on the state of each individual COIN account within the COIN.

Entry functions and state functions take the following arguments: the total amount the COIN account should have pressed/stamped/etc.; the difference (delta) between the amount being requested and the current total amount for this state (thus, during the first attempt to transition to a state, the total amount will always equal the delta); and a brief description of what the API requestor is trying to accomplish (this is useful for support staff during troubleshooting to understand what the user is attempting to accomplish). Entry functions and state functions return the following values: the state the COIN account is in; the next state you should attempt to transition to; and any warning messages returned by the connector.

Usually, states transition in the order listed, but sometimes you need to go back to a previous state. Here are some common situations when that can happen:

STAMPED->PRESSED: The stamp expired, and funds are no longer guaranteed. You need to stamp for more money than you currently have pressed CIRCULATED->STAMPED: You need to circulate for more than you currently have stamped.

CERTIFIED->CIRCULATED: Certified reported a different amount than you have circulated for reasons 1, 2, or 3 (see Certified state details above), so you need to either request additional funds or return some funds so the COIN can be in balance again. CIRCULATED or CERTIFIED->PRESSED: You need to circulate more money than you currently have pressed.

If a COIN account is being asked to stamp and has already circulated at least the amount being requested, then it is considered to be stamped for the requested amount. So, if a COIN account that is certified for $10 is asked to stamp for $8, it must return that the action was successful. It must return the state that it is in, and should request that the next state transition be to circulated. Any refunds necessary will take place during circulation.

A COIN account records transaction records in each state, reflecting the amount that has been pressed/stamped/etc. Transactions have a number of important fields (this list is not exhaustive):

AMOUNT RAW API—This is the amount returned by the API call, if any. This value must exactly match the response value (for example, if the API responds in pennies, the value in this field must not be converted to dollars). This field should not be used for any processing purposes. It is recorded purely to facilitate support personnel.

AMOUNT BALANCE—The current balance of the account in this state.

AMOUNT ORIGINAL—The meaning of this field varies across account types, and can be used to store any useful information. This field must not be used outside the COIN account, as its meaning is unpredictable. COIN accounts should document how they use this field.

AMOUNT EVENT—The difference between the previous balance in this state and the current recorded balance in this state. This value is computed automatically, and is provided purely as an optimization, since this information is commonly requested.

INSTRUMENT REF—The primary key of the vault item that was used to provide credentials for this API call (if any).

TRANSACTION REF—The unique reference for the API call made, provided by the external system (i.e. not a unique ID that we provide to them for our use) (if any).

BEST BY DATE—The meaning of this field varies by state.

PRESSED—no meaning.

STAMPED—After this date, the stamp is no longer valid, and the COIN account must acquire a new stamp (or renew the current one).

CIRCULATED—This is our guess of when the transaction will be certified (provided by the connector). This may be useful for support personal, but should in no way be relied upon.

CERTIFIED—After this date, the transaction can no longer be disputed, and we are free to encase it.

ENCASED—no meaning.

COIN accounts preferably have a max amount that limits the amount that can be requested of any given COIN account. Thus, if a COIN account has a max amount of $10 and it is requested to stamp/circulate/etc. $15, the COIN account base class will limit the amount that was requested to $10 before the COIN account instance ever sees it. Note that it is possible for a connector to report a balance that exceeds this maximum amount. This is likely to cause problems for the rest of the COIN, but is ultimately a problem for the COIN and not this COIN account specifically. Preferably the reports from a connector should always be recorded, regardless of whether or not it makes sense or is in some way "good", even if an attempt is made to throw an exception or otherwise to reject/reverse the account's financial status.

Financial activity involving non-idempotent (non-repeatable) events (typically API calls) should wrap the activity in a pair of transaction records. The first transaction record has its pending flag set to true, and its values should record what we expect the result of the API call to be. Once the API call has been completed successfully, the COIN account will record a transaction indicating the actual results of the event. This is facilitated by the transaction wrap helper method. A COIN account should not begin processing of any kind if its most recent transaction is pending. This indicates that either an event is in progress, or that something went badly wrong while attempting a non-idempotent event. If a transaction records an idempotent event, it should record a single, non-pending transaction after the event has been completed. This is faster, and reduces the number of instances where a human has to be involved after things go badly wrong. For an event to truly be idempotent, it must have no side-effects. Therefore, if the event produces the same result if invoked again, but invoking the event incurs a fee, then the event is not idempotent, and it must be wrapped in a pending/complete transaction pair.

Transactions may be recorded for a particular state. If you ask a COIN account for its most recent balance without specifying a state, it will provide the most recent balance for its current state. Note that the most recent transaction may be in a different state than the current COIN account state. You can specify a particular state or set of states to search for instead of using the current state. This is true for all other transaction information, such as original and event amounts. Note that if a state has no transactions, all of its amounts are implicitly 0. For performance reasons, a transaction should not be recorded with both an event amount and a balance of 0, unless there is a need to update other metadata (such as the best by date).

An example lifecycle for a COIN is shown in FIG. 9. In this example, a COIN account has a max amount of 100, and can successfully stamp and circulate for that amount. Since this COIN account is looking at batch files to get settlement (certified) information and its settlement does not affect other fee accounts, the certified transaction is idempotent and does not need a pending transaction. Encased transactions never need a pending guard, since they never make API calls. They simply record a balance in the current state (encased) to facilitate the COIN as it checks other accounts that are still certified. Notice that pending transactions never have an API amount. Also, this system settled the transaction in pennies, so its API amount is different from the balance.

Another example lifecycle is shown in FIG. 10. FIG. 10 shows the lifecycle for a COIN that gets melted. In this example, the COIN account is initially created, stamped, and circulated for 100. However, the user then decides that they want to refund the account. The account isn't able to refund all the money though. It then certifies that exactly five dollars were moved, and eventually reaches encased without dispute. Note that even if the refund had been able to reduce the account balance to 0, the account would still have been required to record a $0 certified transaction to ensure that the fund movement and refund are not disputed.

Another sample lifecycle is shown in FIG. 11. This is exactly the same as the first example, except that the stamp expired and another one was needed.

In particular embodiments, there may be several special COIN account types: virtual COIN accounts, mode COIN accounts, and test COIN accounts. Virtual COIN accounts can never circulate money. They exist to provide a placeholder for systems that do not have a stamp concept. There is a risk, with COIN that use these accounts, that the accounts actually circulating money will not be able to circulate the amount(s) requested. These accounts will stamp for any amount, up to their account maximum. Virtual COIN accounts may not be the "circulate" start for a COIN. Mode COIN accounts record that it did exactly what you asked it to do, but it doesn't actually do anything. This is useful for tests, or as a placeholder account for systems that are inaccessible. A test COIN account is like a mode COIN account except that it defines static.

As discussed above, a COIN may be a collection of accounts that collectively move money from a source or sources of funds to a destination or destinations of funds. There may be many intermediate accounts, and intermediate sources or destinations contributing funds or charging fees. The COIN manages the transfer of funds between accounts and keeps track of the overall state of the transfer. The COIN uses a state machine to monitor the progress of its COIN accounts. This state machine uses almost the same states as the COIN accounts:

null—The COIN has not been fully created yet.

ISSUED—The COIN has been created, and a UUID has been returned to a requestor, but the COIN has not been pressed yet. The COIN may or may not have accounts associated with it at this point.

PRESSED—All COIN accounts are at least pressed.

STAMPED—All COIN accounts are at least stamped.

CIRCULATED—All COIN accounts are at least circulated.

CERTIFIED—All COIN accounts are at least certified.

ENCASED—All COIN accounts are encased.

The term "at least" means that the COIN may have accounts that are further along in their state processing.

So, a stamped COIN may have accounts that are certified. If COIN accounts must transition back to an earlier state, the COIN must reflect this. So, a COIN that is certified, but has an account that goes back to circulated, will also need to return to circulated. Note that COINs which are encased will never have any further activity and exist purely for reporting purposes. They may safely be moved to read-only storage or transferred to some other archival format, so long as they are still accessible if necessary.

COIN accounts may be processed according to a predefined order determined from the proof COIN. This ordering is referred to as the graph walk. The idea is that all accounts are evaluated in a "forward" direction-trying to push as much money as possible from sources to destinations. Once that's completed, all accounts are evaluated in a "backwards" direction, releasing extra funds and pulling them back towards their sources. COIN accounts must be provided a suggested amount to use. They are, of course, free to ignore this suggestion if they have better information (i.e. if they simply record numbers from a system of record and don't initiate actions against it). A graph walk is a particular ordering in which to traverse the nodes in a graph. A graph cycle is a situation in which a node on a directed graph is reachable from itself. A root node(s) is a particular node or set of nodes from which to start a Graph Walk.

Figure 12:
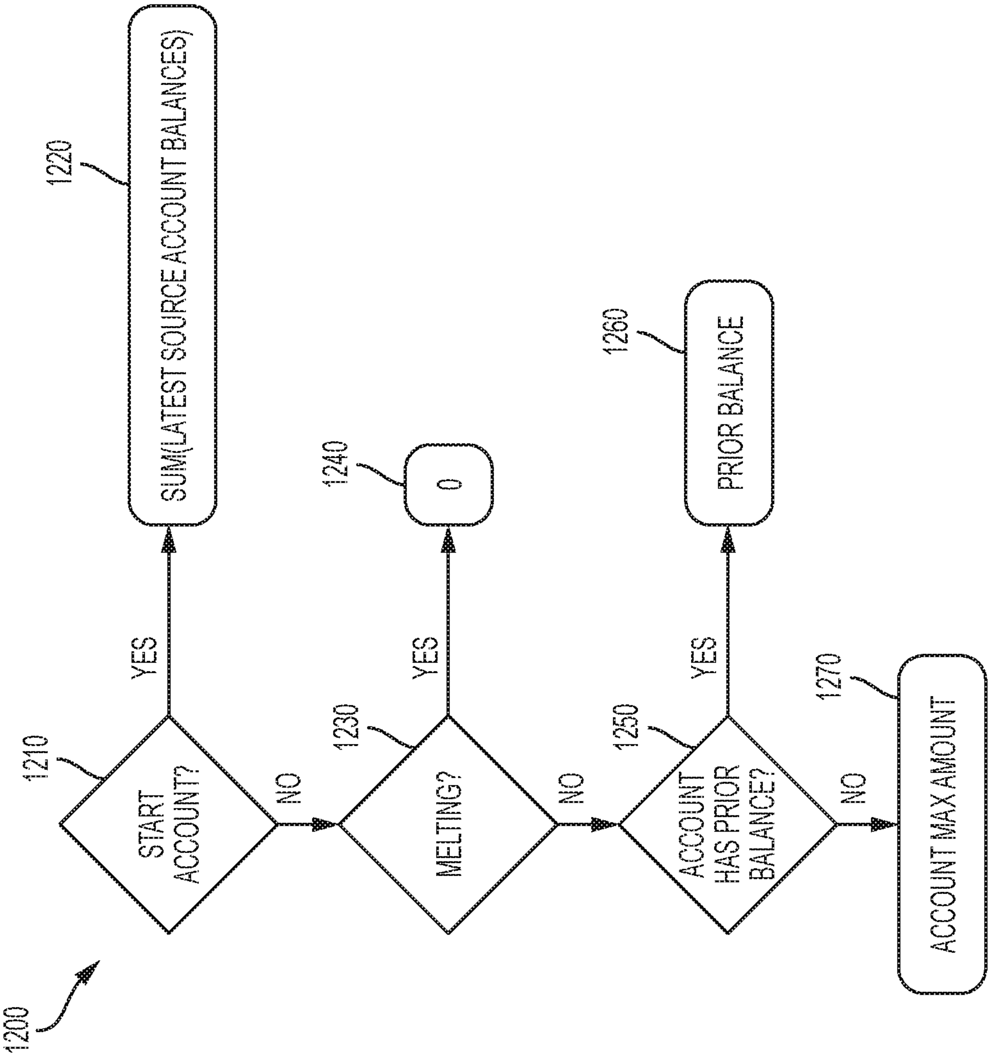
FIG. 12 is a flow-chart diagram of a method under the present disclosure.

The amounts can be calculated in the process shown in FIG. 12. Method 1200 begins at 1210 it is determined whether to start an account or not. If the answer is yes, then the process moves to 1220 and a sum is run of the latest source account balances. If the answer is no, then the process moves to determining whether melting should be performed at 1230. If it is determined to perform melting, then the sum is set to 0 at 1240. If melting is not performed, then the process moves to step 1250 where it is determined if the account has a prior balance. If so, then the prior balance is used 1260. If not, then the account is set to the maximum account at 1270.

After an account is evaluated, the money used by that account (the account's new balance) is subtracted from its source accounts, so the system doesn't overspend money from any account. If a COIN account does not transition to the state requested, the COIN tries to prod the account along. It attempts state transitions on that account, following the account's suggestions, until either the account's next state recommendation is repeated consecutively, or the account reaches the desired state. If the account does not reach the desired state, processing ends, and the COIN is transitioned to whatever state the COIN account ended up in. After all accounts have transitioned, the COIN double-checks that all accounts are in the requested state before transitioning to that state. If all accounts are in balance, the next state is reported as the state after the new state. Otherwise, the next state is reported as the new state. The COIN is considered to be in balance when the amount of money from COIN accounts with no sources (aka inputs) is equal to the amount of money from COIN accounts with no destinations (aka outputs), and when the amount of money transferred between COIN accounts balances to 0 (so no money is implicitly created or destroyed during transfer). So, a COIN with accounts (A,B)->C->D will balance if and only if balance (A)+balance (B)=balance (C)=balance (D). If the value of a COIN account on the COIN changes after another related COIN account has been encased, and that causes an imbalance, a human will have to look at the COIN and decide how best to resolve the difference in balance. It may be possible to automate some of these scenarios in the future.

Figure 14:
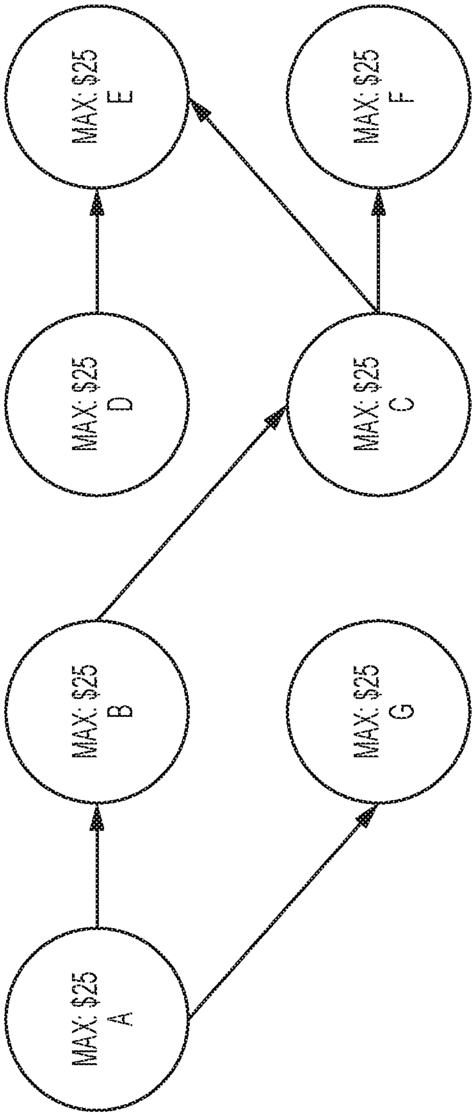
FIG. 14 is a flow-chart diagram of a method under the present disclosure.
Figure 15:
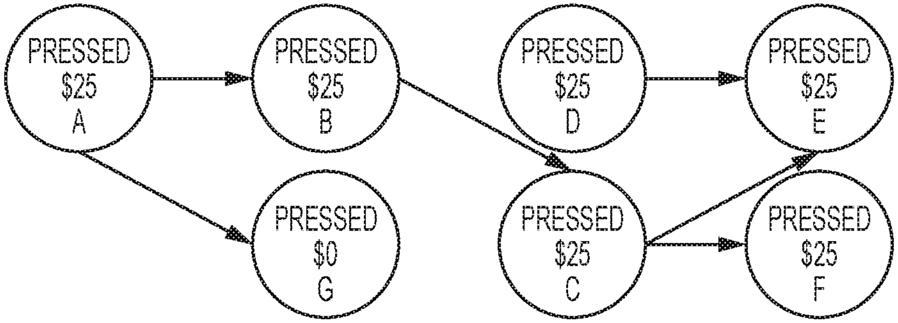
FIG. 15 is a flow-chart and table diagram of a COIN transaction under the present disclosure.
Figure 19:
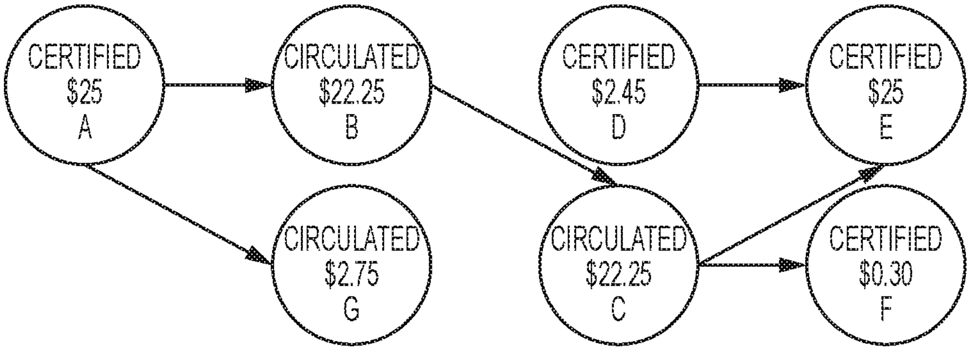
FIG. 19 is a flow-chart and table diagram of a COIN transaction under the present disclosure.
Figure 20:
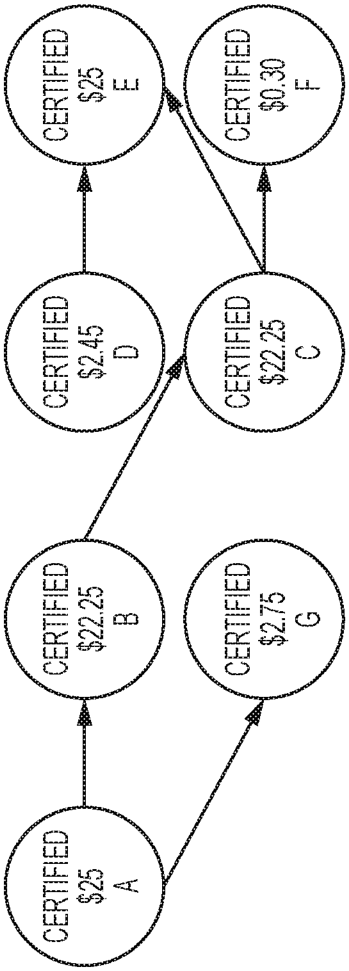
FIG. 20 is a flow-chart and table diagram of a COIN transaction under the present disclosure.
Figure 21:
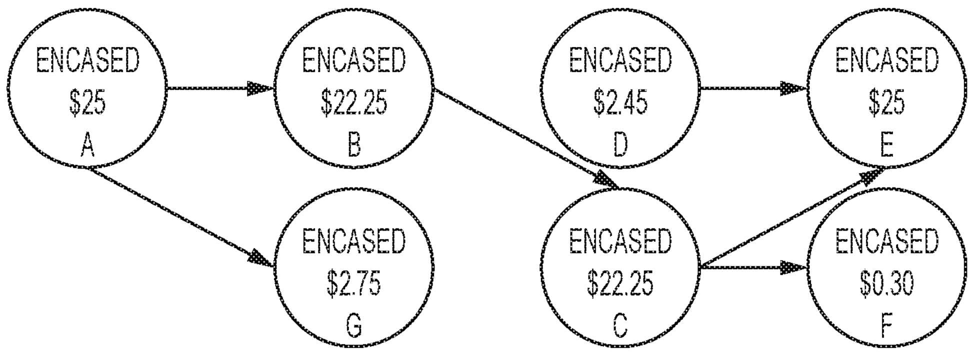
FIG. 21 is a flow-chart and table diagram of a COIN transaction under the present disclosure.

FIG. 13 displays an example transfer between accounts. The example will start with a diagram illustrating how the accounts are connected, with the account's max amount and a name for the account. One can assume that the COIN's max amount is equal to the sum of the account max amounts in the COIN's first column. After the diagram, a list of transactions and events is provided, in the order they would occur. If a list entry does not have any amounts, it represents a state transition. FIGS. 14-21 show different possible permutations of the example given in FIG. 13 with a focus on how during the various COIN states the COIN account states should first progress in order for the COIN state to then progress after all COIN accounts have been progressed. This progression can be depicted in the expected COIN state order described previously as follows:

FIG. 14 shows a permutation of the graph of a more complex COIN chart of accounts with seven COIN accounts. FIG. 15 models a Pressed state transition across the seven COIN accounts depicted in FIG. 14 with amounts depicted both in the table and on the representation of the COIN accounts in the graph. FIG. 16 models a Stamped state transition. FIG. 17 models a Circulated state transition. FIG. 18 models an initial attempt to transition to a Certified state that is unsuccessful because an estimate was not consistent with the eventual value and therefore the COIN remains in Circulated state while all of the COIN accounts except C (which remains in Circulated state) successfully transition to Certified state. FIG. 19 models a propagation of the COIN account C fee change into COIN accounts B and G causing now C, B, and G to all be in Circulated state which also causes the COIN itself to remain in Circulated state. FIG. 20 models a transition of COIN accounts B, G, and C to Certified state which then—since all COIN accounts are now in Certified state—permits the COIN itself to transition to Certified state. FIG. 21 models an Encased state transition after which no further processing should be permitted on this COIN and it is eligible to be archived.

In certain embodiments, a proof COIN is a template for making COINs. It defines the route from a source (or sources) to a destination (or destinations). It can define any and all intermediary accounts involved, including various fees, revenue accounts, discounts, etc. Proof COINs are unique to a service requestor, so requestors only have access to the proof COIN(s) that have been defined for them. A proof COIN is defined by its sources and destinations. Sources are the COIN accounts in the first column, and destinations are the COIN accounts in the last column. Any COIN accounts that are not in the first or last column and do not have inputs or do not have outputs are not considered to be sources or destinations for the proof COIN, even though they are sources or destinations of funds. There may be only one proof COIN per service requestor or for a particular set of inputs and outputs. So, if a COIN defines a route from a credit card to a gift, it is preferred that another proof COIN not be defined for that same service requestor that also routes from a card to a gift. An alternative would be to define a proof COIN from a loyalty account and a credit card to a gift, which will take precedence if both loyalty and credit card are specified as inputs.

Every source and destination account should preferably have a model associated with it. This model will be provided by the API caller when they request a COIN. Accounts within the COIN may require models, but they generally are not explicitly provided models by the API caller. They should either know what model to use without any additional information (ex. by having a static, specified vault item), or they may require a "data source". A data source can comprise another COIN account that this account may reference to get information about the model it should use. For example, a credit card acquiring account will probably have the credit card account as its data source, so it can reference the credit card used by that account. Accounts are preferably free to access relationships on these accounts as necessary. Accounts should not chain data sources. Whenever possible, accounts should directly access a source or destination account. Accounts may have at most one data source.

The proof COIN should preferably define at least one COIN account to be a starting account. All accounts should preferably specify COIN account type and account name. All accounts may have the following information:

- max amount (defaults to the COIN's max amount)
- connector
- display boolean—if true, this COIN account will be displayed in COIN API responses. Sources and destinations should be displayed. Because COINs can be composed of chains of proof COINs, this is enforced when COINs are constructed, not on individual proof COINs
- vault item-static vault credentials used for every COIN instance.

The proof COIN also defines the placement of accounts on a grid, and the connections between accounts. All accounts should be connected to at least one other account. Account names can be used in ledger processing to determine if funds are being transferred correctly. If you have multiple representations of the same real world account on the same COIN (not proof COIN), they should have the same account name.

Proof COINs (and COINs created from them) may form a Directed Acyclic Graph (DAG). A DAG may consist of finitely many vertices and edges, with each edge directed from one vertex to another, such that there is no way to start at any vertex V and follow a consistently-directed sequence of edges that eventually loops back to V again. More specifically, the COIN graph can be a multiply rooted DAG: a rooted directed graph is a digraph with a distinguished node R, such that there is a directed path from R to any node other than r. Multiply rooted means that there can be more than one such node R, or that some set of R nodes satisfies the rooted property. When evaluating accounts on the graph, they are evaluated twice by repeating a topological ordering, with the additional property that for every set of edges {U, V}->W, U always comes before V if U is "higher up" than V. Accounts are evaluated left to right following topological order, and then again right to left, following topological order as if the direction of all edges was reversed (this preserves the height precedence, where simply reversing the first ordering would not).

Because of the complexity in maintaining the height invariant, we currently generate the graph walk (AKA path, chain, or trail) through a custom algorithm. But we could, in principle, modify a well-known topological ordering algorithm to maintain our height invariant. A preferred algorithm is as follows:

1. Temporarily remove any edges into a root node.
2. Add edges from sinks (nodes with no outgoing edges) to sources (nodes with no incoming edges) if the source is in the first column (on the far left) and is not a root node, so long as doing so does not create a cycle. All strongly connected components must have a cardinality of 1.
3. Visit all root nodes in the forward direction, with an annotation that they are root nodes (and thus won't have any pre-existing source amounts to consider).
4. Visit node destinations recursively (forward direction), so long as all parents of the node being visited have been visited.
5. Visit source nodes recursively (backwards direction), so long as all children of the node being visited have been visited.
5. Visit source nodes recursively (backwards direction), so long as all children of the node being visited have been visited.

Figure 22:
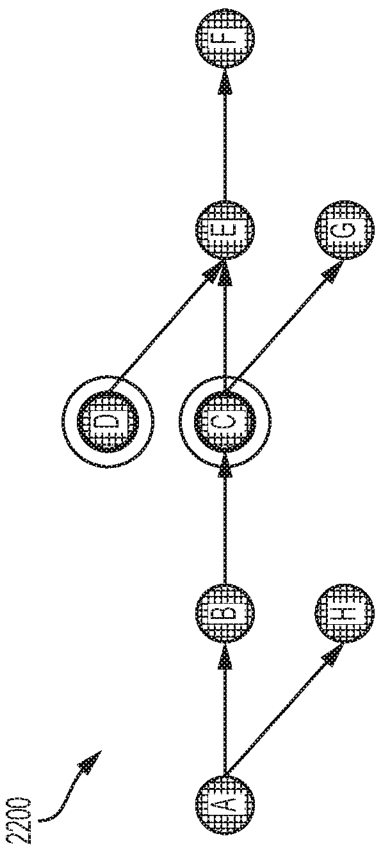
FIG. 22 is a flow-chart diagram under the present disclosure.
Figure 23:
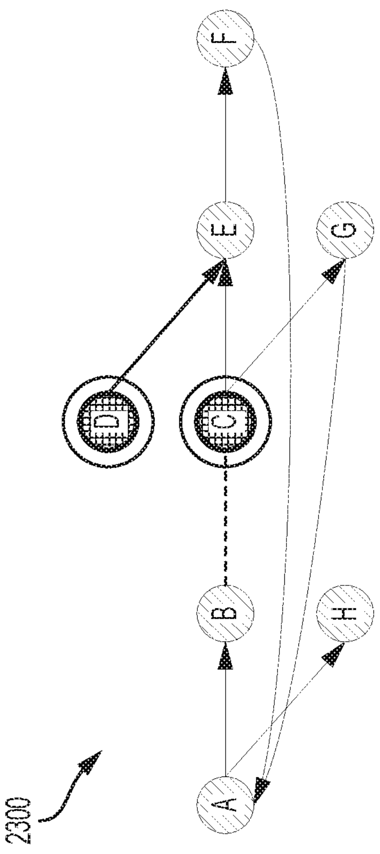
FIG. 23 is a flow-chart diagram under the present disclosure.

The flow chart 2200 in FIG. 22 shows an example of steps 1 and 2. The flow chart 2300 of FIG. 23 shows steps 3 and following. The outlined nodes are the root nodes. The greyscale graph transitions from light grey to dark grey when a node is evaluated forward, and from dark grey to black when it has also been evaluated backwards.

Proof COINs should define the simplest money flows possible. For example, if a service requestor always moves money into a common escrow before distributing it from this escrow to any outputs, the service requestor should have separate proof COINs routing individual inputs to the common escrow, and separate proof COINs routing the escrow out to various destinations. This allows the API to compose proof COINs, and reduce the number of proof COINs necessary to perform money movement between arbitrary combinations (and orders) of sources and destinations. However, this requires some complexity transforming an API request to create a COIN into a complete COIN definition. The user will provide information about the COIN's inputs and outputs. The COIN can then follow the following process:

1. Fetch all proof COINs—First, all proof COINs for the service requestor may be fetched into memory. It is assumed that this is a reasonably small set.
2. Find sources—The list of proof COINs may then be searched for proof COINs matching the specified sources. Proof COINs with multiple sources are preferred over proof COINs for individual sources. If a source does not have at least one eligible proof COIN, the API request fails (the COIN cannot be created).
3. Walk to destinations—From the source COIN accounts, the COIN may then use the destination or destinations of those proof COINs as inputs to route further, excluding any destinations that are already final destinations. Preferably only unique destinations will be considered. This process may be repeated until no further routes are available or all destinations have been reached. For example, inputs that all map to a common escrow will generate a new search from that escrow to the requested outputs. Assuming all requested outputs are reachable from the common escrow, this step may successfully return all the relevant proof COINs. In order for the output of a proof COIN to be considered eligible for the input to another proof COIN, the COIN accounts should be "identical". To be considered identical, they should have the same COIN account type, connector (if any), account name, and vault item (if any). Accounts are considered equal if one account specifies a connector or vault item and the other does not (null is considered equal to any value). This will be resolved in an optimization step later.
4. Connect path—Next, the proof COINs may be connected together into a single proof COIN. Connections are ordered according to the funding order specified by the COIN/mint API call (see the API section). The final proof COIN's sources should always be in the first column, and the destinations in the last column. The column arrangement of any intermediary accounts is undefined. The order within columns should follow the funding order requested, with the most preferred fund's accounts at the top, and should maintain the original proof COIN's arrangement. The process of connecting proof COINs should keep track of the proof COINs that have already been connected, and should prefer to connect other proof COINs to proof COINs that have already been connected, rather than adding additional copies of the proof COIN. If this is not done, each input would have its own disjoint graph, which would make the optimize/compact step much more difficult.
5. Optimize/Compact—Any COIN accounts that connect to themselves may be collapsed. The source (leftmost) account will remain, and its matching destination(s) should be removed, with their destination(s) becoming destination(s) for the remaining source account. Any data sources provided by COIN accounts that have been optimized away should be repointed to the remaining COIN account. Any data sources required by COIN accounts that have been optimized away should be repointed to the remaining COIN account. Picking the right start account is hard. If any of the equivalent COIN accounts was marked for display, the remaining COIN account should be marked for display. If any of the equivalent COIN accounts has a vault item associated with it, the remaining COIN account should be provided with that vault item. If a node ends up with multiple virtual accounts as destinations, links to all but the lowest virtual account should be dropped. Any orphaned virtual accounts that result from this should be removed. Virtual COIN accounts may not be start accounts, and they do not use instrument or connector information, so there are no issues there with the merge. Picking the right start account is hard. It may be possible to optimize further, but it's computationally intensive, potentially dangerous, and outside the scope of this document.

Once a proof COIN has been constructed, it can be uniquely identified by the proof COINs that compose it. If a proof COIN is included multiple times (for instance, for multiple inputs of the same type), that proof COIN's ID should be included multiple times in the final proof COIN's ID. If a proof COIN is reused within the proof COIN (if someone looking at the final proof COIN could not easily identify multiple instances of an internal proof COIN), that proof COIN may be counted multiple times.

COINs may be extended to the right by adding new outputs, or extended "in place" by adding additional inputs. They must not be extended to the left by adding "inputs to the inputs". Doing so could create a situation where the COIN has funds circulated but is unable to stamp for source funds, which would look like an error. Inputs can be added in addition to existing inputs, as though you had specified the new inputs along with the original ones (assuming, of course, that a valid funding route can be found through proof COINs). Outputs can be added in two ways:

1. "In place": Outputs are added in addition to existing output(s), as though you had specified the new outputs along with the original ones (assuming, of course, that a valid funding route can be found through proof COINs).
2. Extension: Outputs can be added as an extension of existing output(s). In this case, you are trying to route from existing output(s) to the newly specified output(s). You must specify all of the COIN's new outputs, not just the ones you wish to add. This allows you to re-specify existing outputs, so that you can extend some, but not all existing outputs. This assumes there exists a valid funding route through proof COINs from existing, unused outputs to the new outputs (existing, preserved outputs may have their COIN account positioning modified, but their funding connections will not be modified). The proof COIN is not expected to re-route from sources to extension destinations, only from existing, unused outputs.

If multiple modifications are requested, but only some can be applied, then the COIN must not be modified in any way. Modification requests are all or nothing. When a COIN is modified, it's proof COIN identifier must be updated to reflect the modification. Preferably, a COIN should never be modified to remove accounts. Modifying the COIN account graph by extension or merging, of course, requires regenerating all cached COIN structures, notably including generating a new graph walk. This extension may also be done during COIN construction (by specifying intermediary accounts or multiple stages of outputs (depending on how you want to think about it)) as an optimization. If that happens, the exact steps and ordering of construction from proof COINs may vary, so long as the result is provably equivalent to constructing a simple COIN(s) and then extending it/them.

Once a valid proof COIN has been found and/or constructed, it needs to be stored in the database as a single COIN, with a unique ID for the proof COIN that it was created from. Any COIN events, transactions, or COIN account events associated with the proof COIN(s) should not be copied onto the new COIN. If any model caches data structures, such as a cache of the COIN account mappings on the COIN, they should be updated.

If merging proof COINs together creates any of these situations, the merged proof COIN is invalid, and must not be used. FIGS. 24A-D give examples of invalid COINs or actions.

Figure 24A:
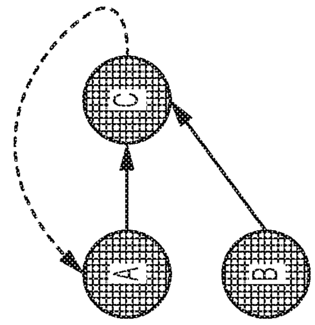
FIGS. 24A-24D are examples of invalid flow-chart diagrams under the present disclosure.
Figure 24B:
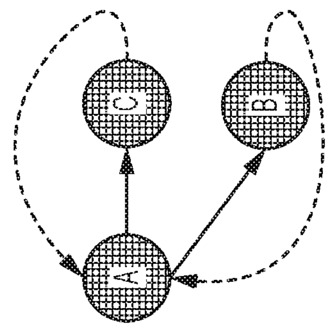

FIG. 24A displays an example of an invalid circulate start. In FIG. 24B account B is an invalid choice for circulation start because a later account (account C) will be evaluated with some, but not all, of its sources already processed. COIN accounts should preferably perform dependent processing with either all or none of their sources evaluated.

FIG. 24B displays an example of another invalid circulate start. Account B is an invalid choice for circulation start because it is in the last column, and it is not the first account in the column. The implied connections from the last column to the first have been added to illustrate why (this is the same problem as in the previous scenario).

Figure 24C:
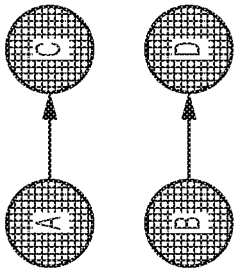

FIG. 24C displays an example of an orphaned subgraph. This proof COIN is invalid because it has an orphaned (disjoint) subgraph. If the proof COIN was an undirected graph, you must be able to start at a COIN account and reach every other COIN account. If you need to move money separately like this, use two (or more) COINs instead.

Figure 24D:
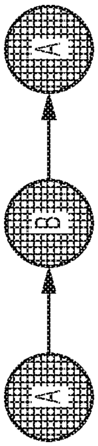

FIG. 24D displays another example. A real world account must never move money to itself.

Figure 25:
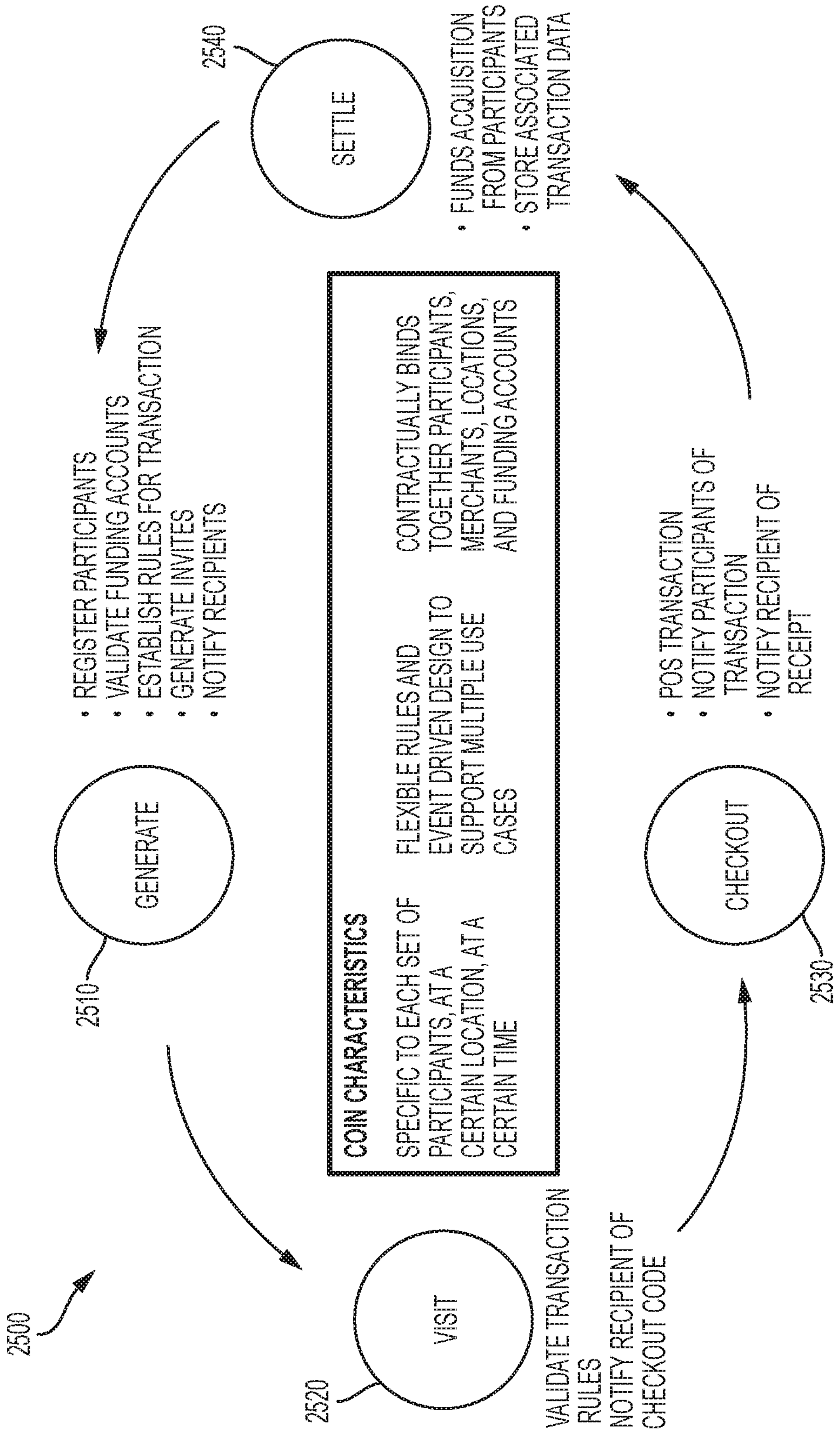
FIG. 25 is a flow-chart diagram of a possible method embodiment and COIN characteristics under the present disclosure.

FIG. 25 is a diagram of possible COIN characteristics and a flow-chart of a possible COIN transaction. At step 2510, a COIN may be generated. COIN generation may include one or more of the following: registering participants that may use the COIN, validating funding accounts that may be used to fund the COIN, establishing rules for a transaction associated with the COIN, generating invites for usage of the COIN, and notifying recipients of the COIN. At step 2520, a COIN user may visit a merchant in an online or physical store. When a COIN user visits a merchant that supports payment via COIN, transaction rules of the merchant and payee may be validated. At step 2530 a user checks out using an associated method of payment. The checkout may be conducted as a typical POS transaction. Participants in the transaction may be notified via message of the transaction, and the recipient may be notified of receipt of payment. At step 2540, the COIN transaction is settled. As part of settlement, funds may be acquired from the participants in the transaction.

Figure 26:
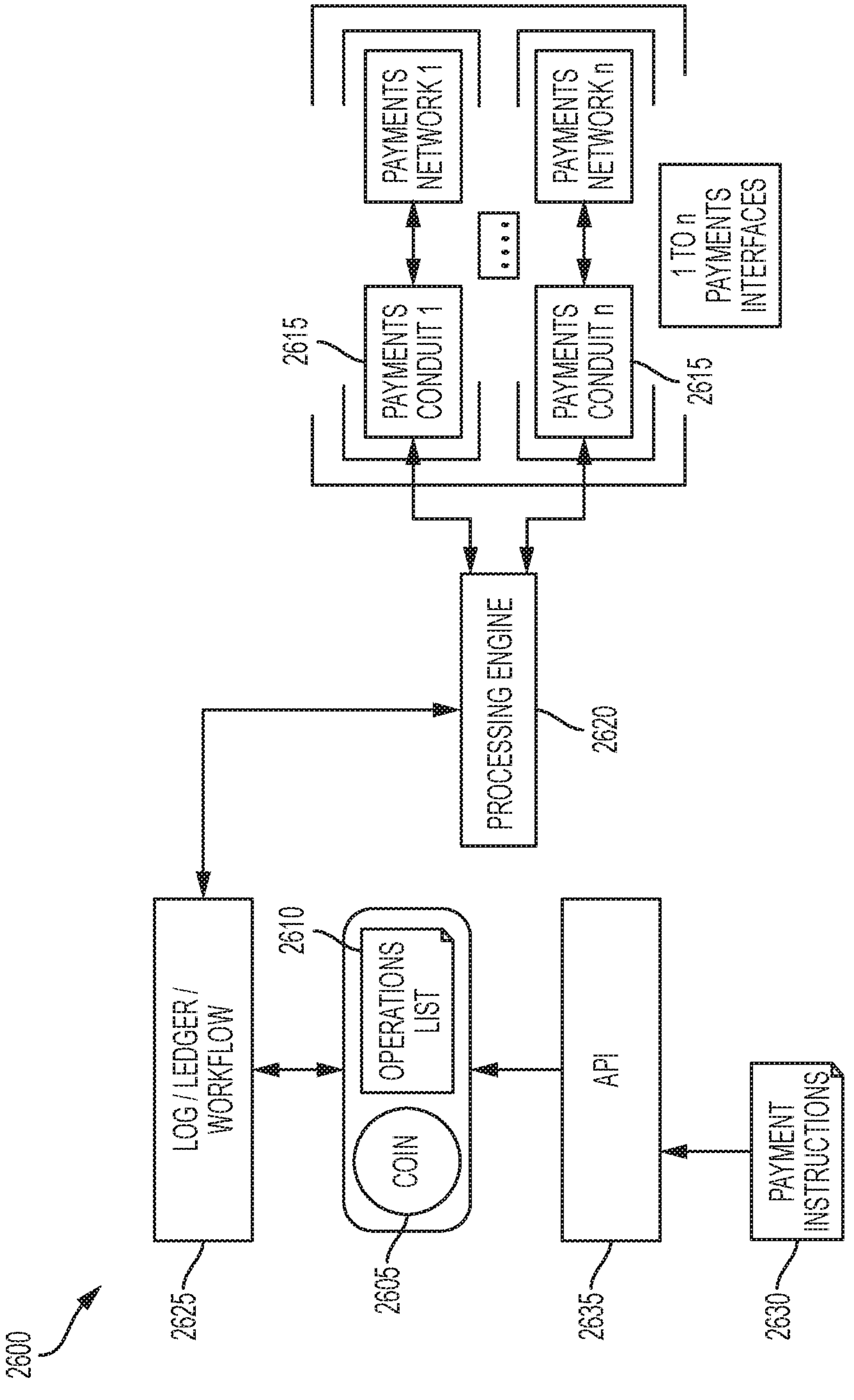
FIG. 26 is a flow-chart diagram of a possible method embodiment under the present disclosure.

FIG. 26 is a block diagram of a COIN based payment operations 2600. When a payment request or payment instruction 2630 is received, a COIN 2605 may be created. Payment instructions 2630 may be received at an application programming interface (API) 2635. An operations list 2610 may be associated with COIN 2605. API 2635 may interact with COIN 2605 and operations list 2610. Operations list 2610 may comprise one or more payment operations that are required in order to complete the payment instructions 2630. Each payment operation is associated with a payment conduit 2615. There may be 1 to n payment operations each corresponding to a payment conduit 2615. For example, a first payment conduit may be related to a consumer requesting funds from the consumer's issuer. A second payment conduit may be related to a rebate offer from an offer provider. A third payment conduit may be related to a gift provided from a third party to the consumer via a gift card provider. A fourth payment conduit may be related to the merchant's acquirer for receiving payment. Log/ledger/workflow 2625 tracks the completion of payment operations in the operations list 2610. Processing engine 2620 may monitor or cause payment operations to execute. At the completion of all the payment operations in the operations list 2610, the COIN will be balanced from an accounting standpoint.

In some embodiments under the present disclosure, payment/payer/payee behavior can be stored, such as in vault 149 of FIG. 1B. Such behavior can be analyzed for trends, advertising services, or other purposes.

Figure 27:
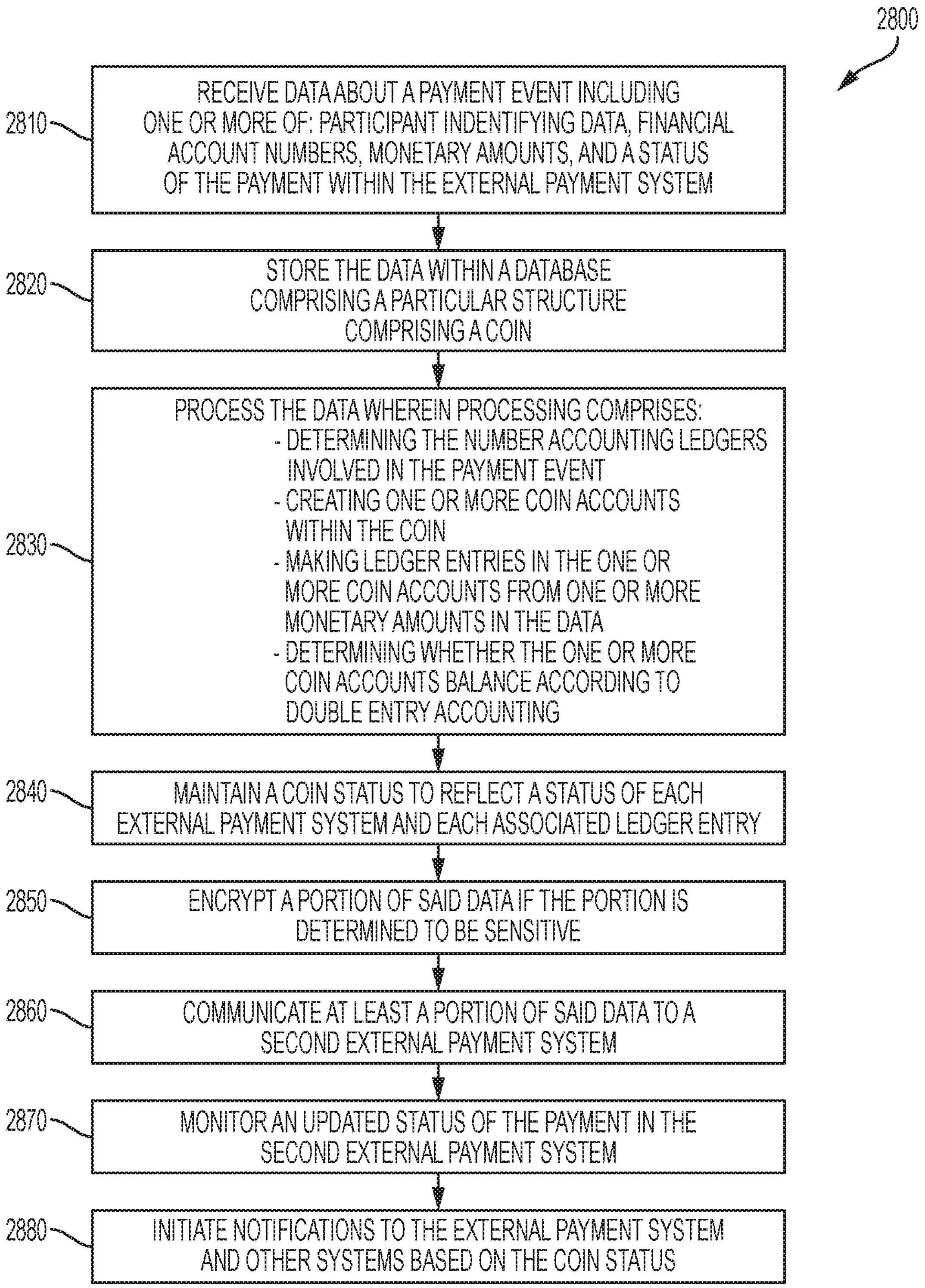
FIG. 27 is a flow-chart diagram of a possible method embodiment under the present disclosure.

A possible method embodiment 2800 is shown in FIG. 27. At 2810, data about a payment event is received from an external payment system, including one or more of; a participant identifying data, one or more financial account numbers, one or more monetary amounts, and a status of the payment within the external payment system. Participant identifying data can include an email address, account number, identification number, or other information. At 2820, the data is stored within a database comprising a particular structure comprising a coin. At 2830, the data is processed, wherein processing comprises; determining the number of accounting ledgers involved in the payment event; creating one or more coin accounts within the coin; making ledger entries in the one or more coin accounts from one or more monetary amounts in the data; and determining whether the one or more coin accounts in the coin balance using double entry accounting. At 2840, a coin status is maintained to reflect a status of each external payment system and each associated ledger entry. At 2850, a portion of said data is encrypted if the portion is determined to be sensitive. At 2860, at least a subset of data is communicated to a second external payment system. At 2870, an updated status of the payment is monitored in the second external payment system. At 2880, notifications are initiated to the external payment system and other systems based on the coin status.

Figure 28:
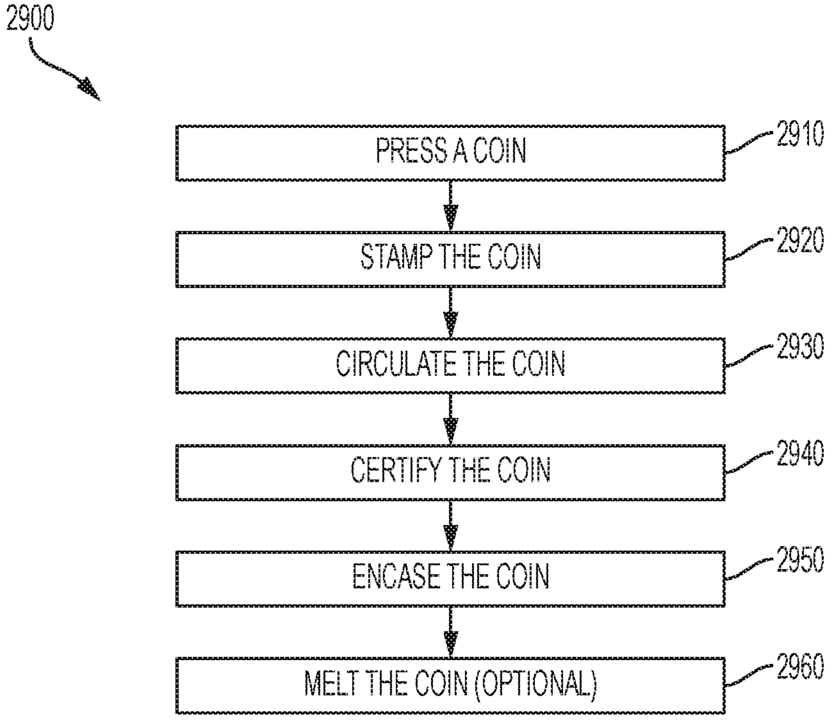
FIG. 28 is a flow-chart diagram of a possible method embodiment under the present disclosure.

Another method embodiment 2900 under the present disclosure is shown in FIG. 28. Method 2900 comprises a method for monitoring and updating a status of a coin, the coin signifying transactions related to a payment event and associated ledger events. At 2910, the coin is pressed, wherein pressing the coin comprises validating one or more sets of credentials and one or more compliance functions. At 2920, the coin is stamped, wherein stamping the coin comprises authorizing debits and credits associated with the financial transaction. At 2930, the coin is circulated, wherein circulating the coin comprises communicating money movement instructions to the payment service provider, the bank, and the retailer. At 2940, the coin is certified, wherein certifying the coin comprises verifying with a system of record that an amount recorded as circulated is equal to an actually circulated amount. At 2950, the coin is encased, wherein encasing the coin comprises waiting for a dispute period to end and closing all further money movement once the dispute period has ended. Optionally, at any point during the process, the coin can be melted at 2960, wherein melting the coin comprises canceling the coin and stopping all further transactions on the coin.

Another method under the present disclosure can comprise a method for relating a plurality of financial accounts with each other with a payment event involving an amount of money. In this embodiment, a plurality of financial accounts can be associated with a predetermined data structure, wherein one of the plurality of financial accounts comprises an initial source account in the predetermined data structure and another of the plurality of financial accounts comprises a final destination account in the predetermined data structure. Next, a plurality of possible money flow paths, by which the amount of money can transfer from the initial source account to the final destination account, can be evaluated. Then, a simplest money flow path from the initial source account to the final destination account can be determined. A set of instructions can be determined for causing a plurality of transactions in the plurality of financial accounts to cause a transfer of the amount of money from the initial source account to the final destination account. Then, the set of instructions can be communicated to the plurality of financial accounts. The plurality of transactions can be linked with the predetermined structure. Then, a plurality of updates can be received on a flow of money along the simplest money flow path from the plurality of financial accounts. The predetermined structure can then be edited with the flow of money based on the plurality of updates as each update is received. The plurality of transactions can then be reconciled for each of the plurality of financial accounts such that the flow of money balances between the initial source account and the final destination account in the predetermined structure.

Another possible method embodiment under the present disclosure can comprise a method for associating financial, business, bank or payment accounts with a predetermined data structure. First, the simplest paths or routes of money movement between the initial source account in the structure and the final destination account in the structure given the various accounts and relationships across or between multiple structures can be evaluated. It can then be determined what are the various models and connectors to payment systems required to achieve the path or route of money movement requested by the payment event. Multiple predetermined structures can then be combined to perform a required path or route of money movement to accomplish a requested money movement. The transactions which occur in the associated accounts can then be linked with the predetermined structure. The path of money movement can be determined based on the transactions as they are posted to the predetermined structure. Then the transactions can be reconciled that occur on each account and with each system across the predetermined structure to ensure that the money movement balances between initial source account and final destination account in the predetermined structure.

Another possible system embodiment under the present disclosure can comprise a system for relating transaction notifications from disparate external payment systems that participate in a payment event comprising. The system can comprise one or more communications servers for receiving requests to associate transactions to or from external payment systems through an application programming interface. It can further comprise one or more processing servers capable of performing directed graph processing to evaluate the relationship between associated accounts based on transaction notifications from external payment systems and calculating the balance of money movement between those accounts. The system can further comprise one or more transaction servers which initiate transaction instructions to external systems based on the notifications received from other external systems and the associations evaluated by the processing servers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A hub system for securely managing an exchange of data between external systems of record about a payment event, such that changes in status are propagated to each system of record, comprising:

one or more first communications servers configured to securely receive a request, via an application programming interface (API) using native semantics of a payee or an external payment system, to initiate or update the payment event by providing data about the payment event including one or more of: participant identifying data of a payer, one or more financial account numbers of the payer, one or more monetary amounts from the payee, or a requested status of the payment event within a destination system of record; wherein the destination system of record is an external billing, external payment, or other external system of record used by the payee to determine amounts of money owed to the payee from the payer for various commercial activities;

the one or more first communications servers configured to translate, via the API, the data about the payment event from the native semantics of the request into a predetermined structure with common semantics;

a secure vault, including one or more first processing servers, operatively coupled to the one or more first communications servers configured to securely store said data about the payment event within a database, wherein the secure vault is cryptographically secured;

one or more connectors, including one or more second communication servers, operatively coupled to the secure vault, configured to:

connect to the external systems of record, wherein each of the one or more connectors translates at least a first portion of the data about the payment event to a formatting and native semantics of the respective external system of record from common transaction semantics and formatting of the hub system, and translates at least of portion of a response from the respective external system of record, and securely communicate at least a subset of the data about the payment event to the external systems of record using the formatting and native semantics of the external systems of record, and record at least a subset of the response from the external systems of record in the common transaction semantics and formatting of the hub system;

a transaction server, including one or more second processing servers, operatively coupled to the one or more first communications servers, to the secure vault and to the one or more connectors, configured to:

store a representation of one or more statuses of each external system of record participating in the payment event, create and maintain accounting ledgers representing values sent or received with each system of record, store one or more statuses of each transaction during the payment event, perform accounting of money movement during the payment event using an assigned accounting, evaluate the transactions required to conform each accounting ledger, and associated connected system of record, to corresponding one or more statuses for the payment event, and initiate the transactions to propagate changes to the one or more statuses of each external system of record participating in the payment event via their respective associated connectors; and the secure vault, the one or more connectors, the transaction server, and the one or more first communications servers are configured to:

process said data about the payment event, wherein processing comprises:

assigning a complete transaction identifier to the payment event which enables a single reference to each of: the payment event, the one or more associated accounting ledgers, the one or more statuses of each external system of record participating in the payment event, and the status of the payment event;

determining the number of accounting ledgers involved in the payment event based on the external systems of record participating in the payment event and a nature of the payment event;

creating one or more accounts, associated with the external systems of record participating in the payment event, within the one or more accounting ledgers;

making ledger entries in the one or more accounts within the one or more accounting ledgers from one or more monetary amounts identified in the data about the payment event received from either an API request or a connected system of record; and determining whether the one or more accounts in the one or more accounting ledgers balance using one or more of flow path or double entry accounting;

determine a flow path of funds amongst the determined accounting ledgers in order to complete the payment event, wherein the flow path comprises a directed acyclic graph (DAG), the DAG comprising a plurality of vertices and a plurality of edges, with each of the plurality of edges directed from one of the plurality of vertices to another, such that there is no way to start at a vertex and follow a consistently-directed sequence of the plurality of edges that eventually loops back to the vertex;

maintain the status of the payment event as reflected by a status of at least the destination system of record, a source system of record, each associated account, and associated ledger entries, including whether each such associated account and associated ledger entries are balanced when using one or more of flow path or double entry accounting; wherein the source system of record is an external payment system of record;

encrypt a second portion of said data about the payment event on a condition that the second portion of said data about the payment event is determined to be sensitive;

translate at least a subset of the data about the payment event from the common transaction semantics of the hub system to native semantics used by each external system of record via a respective API of the respective external system of record;

monitor an updated status of the payment event in the source system of record, via a source connector, and the destination system of record, via a destination connector;

initiate transactions with the source system of record and the destination system of record based on the status, or changes in status, of the payment event as maintained by the transaction server; and translate, after processing by the rest of the hub system, the common transaction semantics of the hub system into native semantics of the payee by way of the API, and upon the conclusion of operations of the rest of the hub system, to return a response using the native semantics of the payee and a format of the payee.

2. The system of claim 1, wherein the complete transaction identifier is a COIN, wherein the COIN associates a series of operations into a complete transaction, and wherein a COIN status can comprise:

pressed, wherein pressing the COIN comprises validating one or more sets of credentials and one or more compliance functions;

stamped, wherein stamping the COIN comprises authorizing debits and credits associated with a financial transaction;

circulated, wherein circulating the COIN comprises communicating money movement instructions to a payment service provider, a bank, and a retailer;

certified, wherein certifying the COIN comprises verifying with a system of record that an amount recorded as circulated is equal to an actually circulated amount;

encased, wherein encasing the COIN comprises waiting for a dispute period to end and closing all further money movement once the dispute period has ended; and melted, wherein melting the COIN comprises canceling the coin and stopping all further transactions on the COIN.

3. The system of claim 2, wherein the first portion of the data about the payment event comprises the one or more financial account numbers; and wherein the complete transaction identifier status includes the COIN status.

4. The system of claim 1, wherein the participant identifying data comprises an email address.

5. The system of claim 1, wherein the participant identifying data comprises an identification number.

6. The system of claim 1, wherein the one or more financial account numbers comprises a participant's bank account number.

7. The system of claim 1, wherein the one or more financial account numbers comprises a credit card account number.

8. The system of claim 1, wherein each update to the status of the payment event is required to result in a payment event that is balanced from an accounting perspective.

9. The system of claim 1, wherein the secure vault, the one or more connectors, the transaction server, and the one or more first communications servers are further configured to:

translate at least a subset of the data about the payment event to common transaction semantics of the hub system from native semantics used by each external system of record and the one or more first communications servers.

10. The system of claim 1, further comprising:

a COIN API configured to communicate with the payer and the payee.

11. The system of claim 1, wherein the destination connector is configured to receive a payee notification of one or more monetary amounts received in a payee bank account at a payee bank, wherein the notification is received in the native semantics of the payee bank.

12. The system of claim 11, wherein the destination connector is further configured to translate the payee notification to the common transaction semantics of the hub system.

13. The system of claim 12, wherein the destination connector, the secure vault, the one or more connectors, the transaction server, and the one or more first communications servers are further configured to:

determine whether the one or more monetary amounts received in the payee bank account at the payee bank matches corresponding one or more monetary amounts in the data about the payment event; and update the destination system of record to reflect that the one or more monetary amounts received in the payee bank account at the payee bank matches the corresponding one or more monetary amounts in the data about the payment event.

14. The system of claim 1, wherein the source connector is configured to receive a payer notification of one or more monetary amounts transferred from a payer bank account or a payment account, wherein the notification is received in the native semantics of a payer payment system.

15. The system of claim 14, wherein the source connector is further configured to translate the payer notification to the common transaction semantics of the hub system.

16. The system of claim 15, wherein the source connector, the secure vault, the one or more connectors, the transaction server, and the one or more first communications servers are further configured to:

determine whether the one or more monetary amounts transferred from the payer bank account or payment account at the payer payment system matches corresponding one or more monetary amounts in the data about the payment event; and update the source system of record to reflect that the one or more monetary amounts transferred from the payer bank account or payment account at the payer payment system matches the corresponding one or more monetary amounts in the data about the payment event.

17. The system of claim 1, wherein the one or more first communications servers are the same as the one or more second communications servers.

18. The system of claim 1, wherein the one or more first processing servers are the same as the one or more second processing servers.

* * * * *